United States Patent
Yamada et al.

(10) Patent No.: US 7,416,255 B2
(45) Date of Patent: Aug. 26, 2008

(54) SEAT RECLINING APPARATUS FOR VEHICLE

(75) Inventors: Yukifumi Yamada, Toyota (JP); Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 72 days.

(21) Appl. No.: 11/637,134

(22) Filed: Dec. 12, 2006

(65) Prior Publication Data
US 2007/0132294 A1 Jun. 14, 2007

(30) Foreign Application Priority Data
Dec. 14, 2005 (JP) .............................. 2005-360551

(51) Int. Cl.
*B60N 2/02* (2006.01)

(52) U.S. Cl. .................................................. 297/367
(58) Field of Classification Search ................. 297/366, 297/367
See application file for complete search history.

(56) References Cited

U.S. PATENT DOCUMENTS

| 6,092,874 | A | * | 7/2000 | Kojima et al. | ................ 297/367 |
| 6,095,608 | A | * | 8/2000 | Ganot et al. | ................ 297/367 |
| 6,626,495 | B2 | | 9/2003 | Okazaki et al. | |
| 6,669,296 | B2 | * | 12/2003 | Moriyama et al. | ........... 297/367 |
| 6,991,294 | B2 | * | 1/2006 | Choi | ........................... 297/367 |
| 7,334,843 | B2 | * | 2/2008 | Yamada et al. | ............... 297/367 |

FOREIGN PATENT DOCUMENTS

JP     2003-379 A     1/2003

* cited by examiner

*Primary Examiner*—Anthony D Barfield
(74) *Attorney, Agent, or Firm*—Buchanan Ingersoll & Rooney PC

(57) ABSTRACT

A seat reclining apparatus for a vehicle includes a first plate held at one of a seat cushion frame and a seatback frame, a second plate held at the other one of the seat cushion frame and the seatback frame, a pole having an external tooth facing the internal tooth, a first protrusion provided at the pole, a restricting portion provided at the second plate so as to face the first, the restricting portion coming in contact with the first protrusion so that the internal tooth and the external tooth are prohibited from being engaged, a second protrusion provided at the pole, and a stopper portion provided at the second plate for keeping a rotational angle of the second plate relative to the first plate at a predetermined angle upon a contact with the second protrusion.

9 Claims, 15 Drawing Sheets

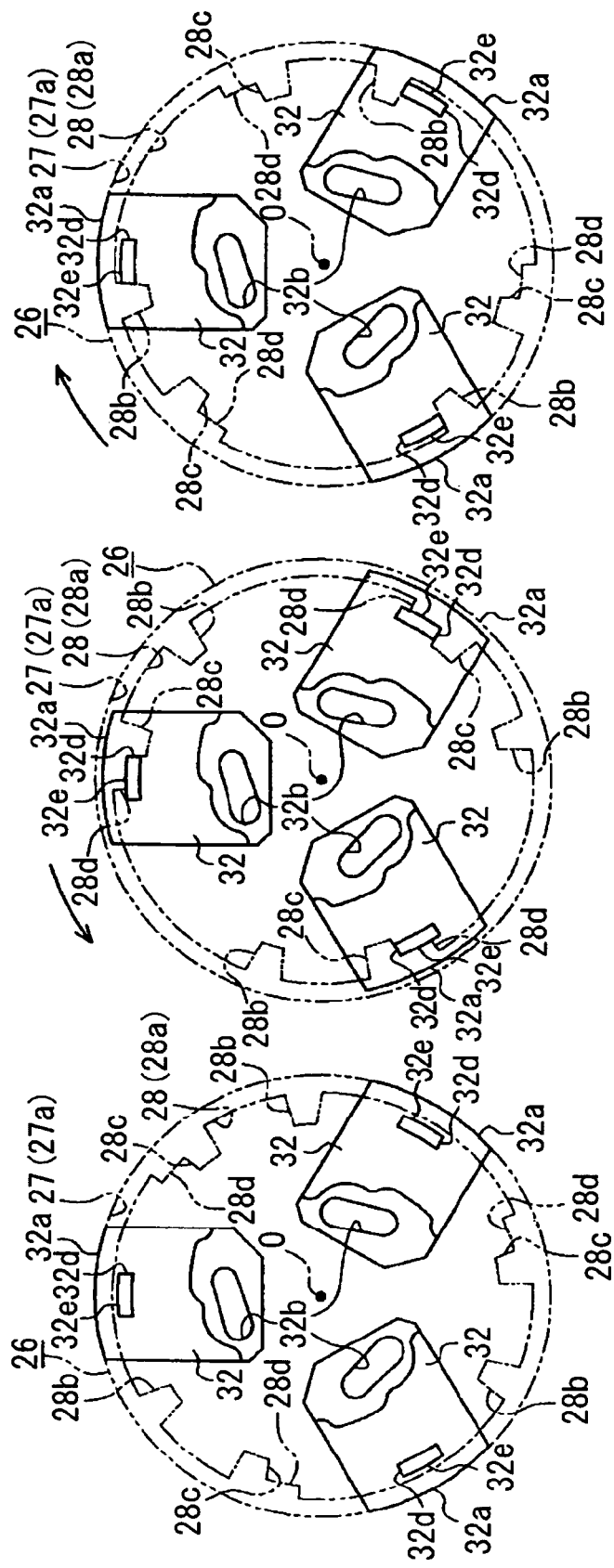

SEAT RECLINING APPARATUS FOR VEHICLE

This application is based on and claims priority under 35 U.S.C. § 119 to Japanese Patent Application 2005-360551, filed on Dec. 14, 2005, the entire content of which is incorporated herein by reference.

FIELD OF THE INVENTION

The present invention relates to a seat reclining apparatus for a vehicle.

BACKGROUND

Conventionally, as a seat reclining apparatus for a vehicle for tilting a seatback relative to a seat cushion, there has been known an apparatus disclosed in JP2003-000379A, for example. The seat reclining apparatus for a vehicle comprises an upper plate (2) having an internal tooth (25a) and a lower plate (1) on which a plurality of poles (50, 60) are movably mounted in a radial direction. As a cam (40) provided about a rotational shaft rotates, the internal tooth of the upper plate and external teeth (54, 64) of the pole are engaged or released with or from each other, so that the rotation of the upper plate relative to the lower plate is restricted or allowed. Due to this structure, the rotation of the seatback relative to the seat cushion is restricted or allowed, so that the seatback can be adjusted and kept at a tilted angle preferable and desired for a passenger to seat.

Further, in a recessed portion (25) forming the internal tooth of the upper plate, a recessed portion (26) having an inner diameter smaller than the diameter of the recessed portion (25), concentric with the recessed portion (25), and recessed into deeper depth than the recessed portion (25) is provided. The recessed portion (26) is formed with a first stopper portion (27a) and a second stopper portion (27b) projecting radially inward from the inner peripheral surface thereof at an interval with a predetermined angle. On the other hand, one specific pole (50) is formed with a projection (51). As a result that the end surface at one side or the other side of the projection in the circumferential direction about the rotational shaft is brought into contact with the opposed surface of the first or the second stopper, the rotational angel of the upper plate relative to the lower plate, that is, the rotational angle of the seatback relative to the seat cushion is kept at a predetermined angle.

Further, the recessed portion (26) is formed with a restricting portion (28) projecting radially inward from the inner peripheral surface by the length of projection smaller than the first and second stopper portions within a predetermined angular range between the first and second stopper portions located at the side where the one specific pole is disposed. In the state where the projection of the pole is opposed to the restricting portion in the radial direction, the end surface of the projection located radially outward is brought into contact with the opposed surface of the restricting portion. In this state, the radial movement of the pole for engagement with the upper plate is restricted, and the rotation of the upper plate relative to the lower plate is kept in a permissive state. That is, the restricting portion defines an angular range in which the permissive state of the rotation of the upper plate relative to the lower plate is kept as it is, that is, an angular range in which the permissive state of the rotation of the seatback relative to the seat cushion is kept as it is. Thus, the rotational angle of the seatback relative to the seat cushion is maintainable in a range except for the angular range described above.

However, according to the seat reclining apparatus disclosed in JP2003-000379A, two kinds of poles (50, 60) are required, inevitably resulting in an increase in the number of kinds of parts. Further, the permissive state of the rotation of the upper plate relative to the lower plate is kept only by the engagement between the upper plate and one specific pole (50). The remaining pole (60) is controlled via a cam (40) which engages with the pole (60) by inserting a projection (47) into a cam hole (56) of one specific pole. Therefore, the remaining pole is movable in a radial direction within a clearance created between the pole and the projection (47) inserted into the cam hole (66). In this state, for example, even in the permissive state of the rotation of the upper plate relative to the lower plate, the external tooth (64) may interfere with the internal tooth of the upper plate.

A need thus exists to provide a seat reclining apparatus for a vehicle capable of suppressing an increase in the number of kinds of parts.

SUMMARY OF THE INVENTION

According to an aspect of the present invention, a seat reclining apparatus for a vehicle includes a first plate held at one of a seat cushion frame and a seatback frame, a second plate held at the other one of the seat cushion frame and the seatback frame, the second plate having an internal tooth and rotatably supported by the first plate, a pole having an external tooth facing the internal tooth in a radial direction and arranged at the first plate, the pole operated to move in the radial direction so as to restrict a rotation of the second plate relative to the first plate with the internal tooth and the external tooth engaged or to allow the rotation of the second plate relative to the first plate with the internal tooth and the external tooth disengaged, a first protrusion provided at the pole, a restricting portion provided at the second plate so as to face the first protrusion at a radially outward side, the restricting portion coming in contact with the first protrusion so that the internal tooth and the external tooth are prohibited from being engaged, a second protrusion provided at the pole, and a stopper portion provided at the second plate so as to face the second protrusion in a circumferential direction for keeping a rotational angle of the second plate relative to the first plate at a predetermined angle upon a contact with the second protrusion.

According to another aspect of the present invention, a seat reclining apparatus for a vehicle includes a first plate held at one of a seat cushion frame and a seatback frame, a second plate held at the other one of the seat cushion frame and the seatback frame, the second plate having an internal tooth and rotatably supported by the first plate, a pole having an external tooth facing the internal tooth in a radial direction and arranged at the first plate, the pole operated to move in the radial direction so as to restrict a rotation of the second plate relative to the first plate with the internal tooth and the external tooth engaged or to allow the rotation of the second plate relative to the first plate with the internal tooth and the external tooth disengaged, a first protrusion provided at the pole, a restricting portion provided at the second plate so as to face at least one of the first protrusion of the pole at a radially outward side, the restriction portion coming in contact with the first protrusion so that the internal tooth and the external tooth are prohibited from being engaged, a second protrusion provided at one of the first plate and a to-be-connected body unrotatably connected with the first plate, and a stopper portion provided at the second plate so as to face the second protrusion in a circumferential direction for keeping a rotational angle of the second plate relative to the first plate at a predetermined angle upon a contact with the second protrusion.

BRIEF DESCRIPTION OF THE DRAWINGS

FIG. 4A is a front view schematically showing the first embodiment.

FIG. 4B is a front view schematically showing the first embodiment.

FIG. 4C is a front view schematically showing the first embodiment.

DETAILED DESCRIPTION

First Embodiment

Figure 1:
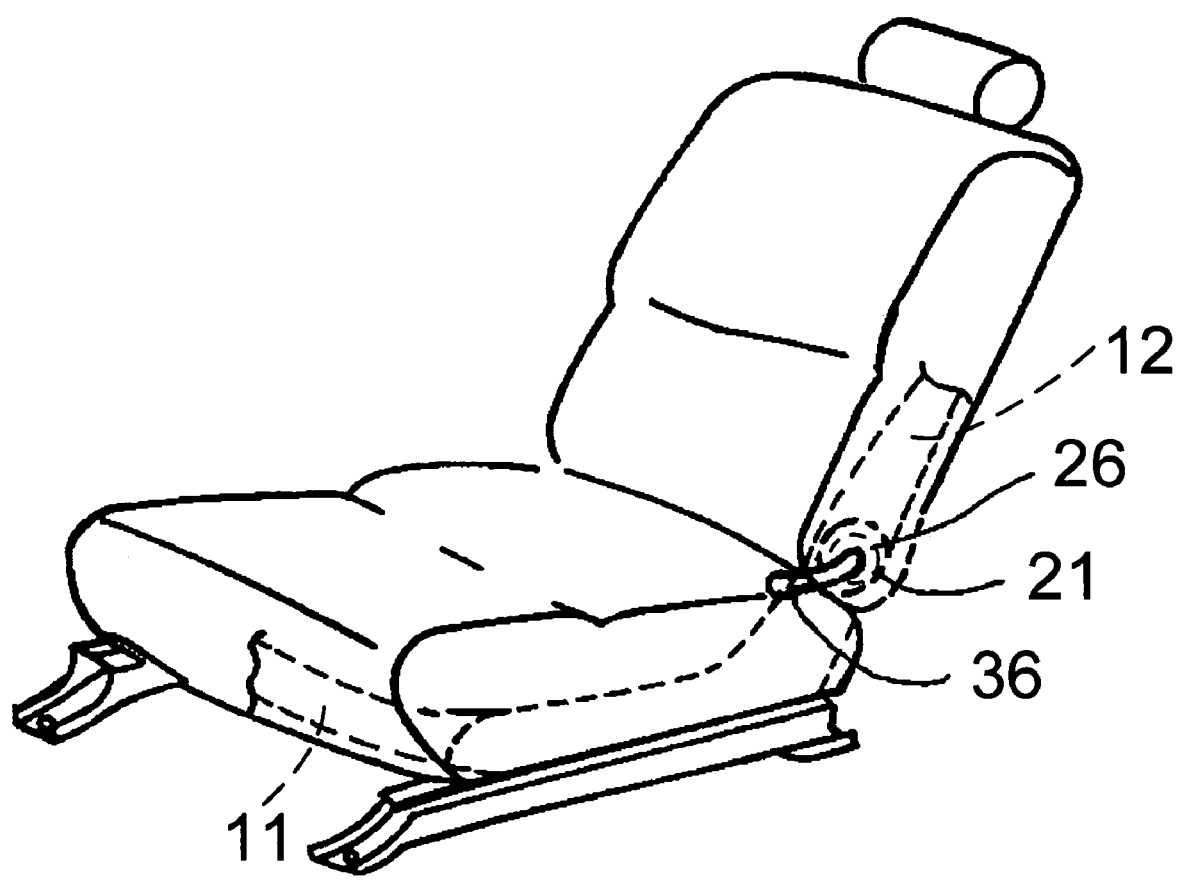
FIG. 1 is a view illustrating a seat reclining apparatus mounted on a seat according to an embodiment of the present invention
Figure 2:
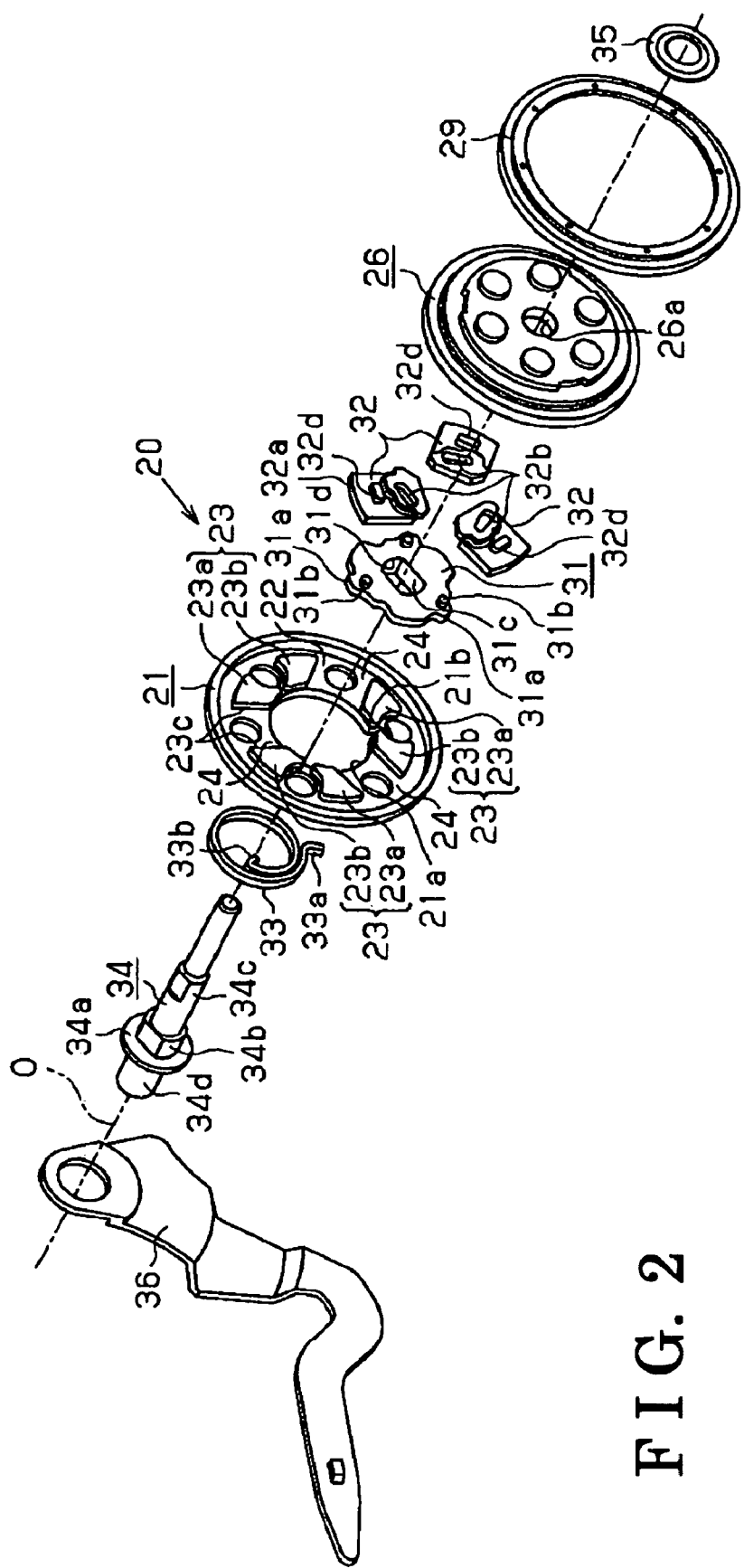
FIG. 2 is an exploded perspective view showing a first embodiment of the present invention.
Figure 3:
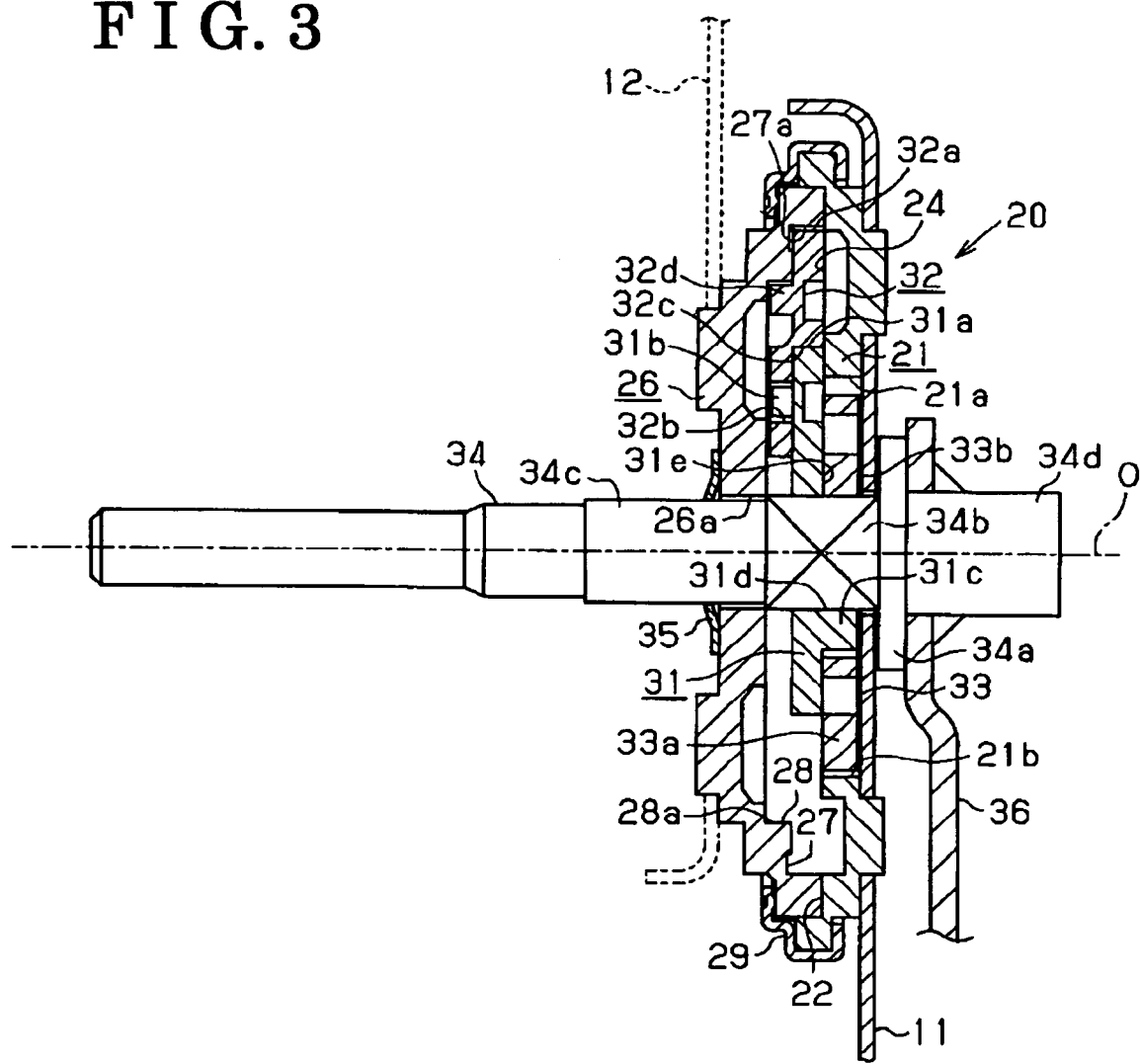
FIG. 3 is a cross-sectional view showing the first embodiment.

A first embodiment that embodies the present invention will now be described with reference to the drawings. FIG. 1 is a view illustrating a seat reclining apparatus mounted on a seat. FIGS. 2 and 3 are an exploded perspective view and a cross-sectional view showing a seat reclining apparatus for a vehicle to be mounted on a vehicle such as an automobile. The seat reclining apparatus for a vehicle comprises a pair of the structures shown in FIGS. 2 and 3 in a width direction of a vehicle sheet. In this context, a structure to be located at the right side of the vehicle when seen from its front is illustrated as a typical example. Thus, the following description will be made as to a structure to be located at the right side of the vehicle as a common structure to be located at the opposite sides of the vehicle as a typical example.

As shown in FIG. 3, the seat reclining apparatus for a vehicle comprises a seat cushion frame 30 made of metal plate, which constitutes a frame of a seat cushion. To the seat cushion frame 11, a seatback frame 12 made of metal plate, which constitutes a frame of a seatback is rotatably connected via a locking mechanism 20 about a rotational axis O. The locking mechanism 20 is to switch the seatback frame 12 between a state where its rotation against the seat cushion frame 11 is restricted and a state where its rotation against the seat cushion frame 11 is allowed. Basically, the locking mechanism 20 keeps the seatback frame 12 in a rotation restricted state relative to the seat cushion frame 11.

Next, the locking mechanism 20 will be described. A lower plate 21 serving as a first plate firmly welded to the inner side surface of the seat cushion frame 11 is formed by half-blanking of a metal plate. As shown in FIG. 2, the lower plate 21 is formed into the shape of a ring having a through hole 21a at its center. The lower plate 21 is further formed with a stopper hole 21b continuous with the through hole 21a and formed outward in the radial direction thereof into a recessed shape.

The lower plate 21 further comprises a recessed portion 22 formed into the shape of a round recess at an opposite side of the seat cushion frame 11. The recessed portion 22 comprises a plurality (three) of protrusions 23 projecting from the bottom wall thereof at an interval with an equal angle (120 degrees). Each protrusion 23 is composed of two molded portions 23a, 23b divided in a circumferential direction, and a side surface 23c radially extending in a flat manner and parallel to the side surface 23c of the adjacent protrusion 23. The lower plate 21 further includes a guide groove 24 radially extending between the adjacent side surfaces 23c.

As shown in FIG. 3, an upper plate 26 (i.e., second plate) firmly welded to the inner side wall of the seatback frame 12 is formed by half blanking of a metal plate into the shape of a ring having an outer diameter equal to an inner diameter of the recessed portion 22 and having a shaft penetrating hole 26a at its center. The upper plate 26 is mounted in such a manner that its outer peripheral surface is slidably in contact with the inner peripheral surface of the recessed portion 22. Specifically, the upper plate 26 is pivotally supported by the lower plate 21. Due to this structure, the seatback frame 12 is rotatably connected to the seat cushion frame 11 via the lower plate 21 and the upper plate 26 (the locking mechanism 20).

The upper plate 26 is formed with a recessed portion 27 at the opposite side of the seatback frame 12 (at the side of the lower plate 21). The recessed portion 27 is concentric with the shaft penetrating hole 26a and recessed into the shape of circle in an axial direction. On the inner peripheral surface of the recessed portion 27, an internal tooth 27a is formed. In a state where the upper plate 26 is mounted on the lower plate 21, the internal tooth 27a opposes to a guide groove 24 in its radial direction. The recessed portion 27 is formed with a recessed portion 28 at an inner peripheral side of the internal tooth 27a. The recessed portion 28 further recessed into a circular shape concentric with the recessed portion 27 in a radial direction and having an inner diameter smaller than the inner diameter of the recessed portion 27.

As shown in FIGS. 4A-4C, the upper plate 26 comprises a plurality of (three) first stopper portions (i.e., stopper portions) 28b formed to be projected from the inner peripheral surface 28a of the recessed portion 28 radially inward at an interval with an equal angle (120 degrees). The upper plate 26 further comprises a plurality of (three) second stopper portions (i.e., stopper portions) 28c formed to be projected from the inner peripheral surface 28a of the recessed portion 28 radially inward at an interval with an equal angle (120 degrees) in such a manner that each second stopper portion 28c is located at a position between the adjacent first stopper portions 28b in a circumferential direction. The length of projection extending radially inward of each of the first and the second stopper portions 28b, 28c is set to be equal to each other. Further, the upper plate 26 comprises a plurality of (three) restricting portions 28d formed to be projected from the inner peripheral surface 28a of the recessed portion 28 to the inward in a radial direction at an interval with an equal angle (120 degrees) in such a manner that the restricting portions 28d are continuous to one side in a circumferential direction of each second stopper portion 28c (to the side in a counterclockwise direction in FIGS. 4A-4C). The length of projection extending radially inward of each restricting portion 28d is set to be shorter than the length of projection extending radially inward of each second stopper portion 28c. Specifically, the second stopper portion 28c and the restricting portion 28d are formed to be projected inward in a radial direction to create a stepwise structure.

As shown in FIG. 3, in a state where the upper plate 26 is mounted on the lower plate 21, a ring-shaped holder 29 made of metal plate is mounted on the peripheral portions of the upper plate 26 and the lower plate 21. The holder 29 prevents the lower plate 21 and the upper plate 26 from slipping out in an axial direction while permitting them to relatively rotate.

In a state where the upper plate 26 is mounted on the lower plate 21, in an inner space created between the recessed portion 22 and the recessed portions 27 and 28, a cam 31 formed by half-blanking of a metal plate is rotatably accommodated about the rotational axis O. As shown in FIG. 2, the cam 31 comprises a plurality of (three) cam portions 31a extending in a radial direction at an interval with an equal angle (120 degrees). Each cam portion 31a is formed with a pin-shaped projection 31b projecting to be parallel to an axial direction toward the upper plate 26. The cam 31 further comprises a projected wall portion 31c projected into a column shape located at one side in an axial direction (at the side of the lower plate 21) having an outer diameter smaller than the inner diameter of the through hole 21a. The cam 31 also comprises an engagement hole 31d having an oval shape in its cross section and penetrating the centers of the cam 31 and the projected wall portion 31c in their axial directions. Further, as shown in FIG. 3, the projected wall portion 31 is formed with a groove portion 31e extending to be parallel to the radial direction and opened toward the engagement hole 31d.

As shown in FIG. 2, each guide groove 24 is formed with a pole 32 having a width slightly smaller than the width in the peripheral direction of the guide groove 24 and formed into a rectangular plate. The top end of each pole 32 is slidably in contact with the side surface 23c of the projection 23 so that the movement of the top end of each pole 32 in the radial direction is guided. Further, the top end of each pole 32 is formed with an external tooth 32a to be engaged with the internal tooth 27a of the upper plate 26 (see FIG. 3), whereas a base end portion of each pole 32 is formed with a cam hole 32b penetrating in the thickness direction. The cam hole 32b is tilted toward a circumferential direction about the rotational axis O. The pole 32 is engaged with the cam hole 32b by inserting the projection 31b of the cam 31 into the cam hole 32b.

Further, as shown in FIG. 3, each pole 32 is set with a stepwise portion in an axial direction between the external tooth 32a and the cam hole 32b. The end surface of the pole 32 opposed to the stepwise portion in the radial direction constitutes a pole cam surface 32c. The pole cam surface 32c extends so as to cross the side surface of the pole 32 and to have a tilted angle with respect to the pitch circle of the external tooth 32a. The pole 32 is engaged with the pole cam surface 32c by bringing the top end surface of the cam portion 31a into contact with the pole cam surface 32c.

Specifically, when the cam 31 rotates toward one side (in a clockwise direction in FIG. 2) in the state where the cam 31 and the pole 32 are accommodated in the space between the lower plate 21 and the upper plate 26 (in the inner space), as the cam hole 32b is pressed by the projection 31b of the cam 31, the pole 32 moves in the radial direction along the guide groove 24 as if it is retracted into the guide groove 24. At this time, the engagement between the external tooth 32a of the pole 32 and the internal tooth 27a of the upper plate 26 is released, so that the upper plate 26 becomes rotatable relative to the lower plate 21. Then, the upper plate 26 is set into the rotation permissive state relative to the lower plate 21.

On the other hand, when the cam 31 rotates toward the other side (in a counterclockwise direction in FIG. 2), the cam hole 32b is pressed by the projection 31b of the cam 31 and the pole cam surface 32c is pressed by the top end surface of the cam portion 31a. As a result, the pole 32 moves along the guide groove 24 as if it projects in the radial direction. At this time, the external tooth 32a of the pole 32 and the internal tooth 27a of the upper plate 26 engage with each other, resulting in the rotation of the upper plate 26 relative to the lower plate 21 disabled. Then, the rotation restricted state of the upper plate 26 relative to the lower plate 21 is set.

In this context, as shown in FIG. 3, the base end portion of the pole 32 formed with the cam hole 32b is dislocated from the top end portion formed on the external tooth 32a in the axial direction by the step described above, and an inner peripheral surface 28a of the recessed portion 28 is opposed thereto in the radial direction. On the top end portion of the pole 32, protrusions 32d as a first protrusion and a second protrusion are formed to project to be parallel to the axial direction, utilizing the space created at the side of the recessed portion 28 by the dimension of the step. Specifically, the position in the axial direction of the protrusion 32d overlaps with the position in the axial direction of the inner peripheral surface 28a. As shown in FIGS. 4A-4C, the pole 32 is located between the first stopper portion 28b and the restricting portion 28d adjacent to each other in the circumferential direction. In the state where the pole 32 projects in a radial direction into the form described above, that is, in the state where the internal tooth 27a and the external tooth 32a engage with each other, the top end surface 32e of the protrusion 32d located radially outward is located more radially inward than the inner peripheral surface 28a, that is, located more radially outward than the top end surface of the restricting portion 28d located radially inward (see FIG. 4A).

On the other hand, in the state where the pole 32 is retracted in a radial direction into the form described above, that is, in the state where the engagement between the internal tooth 27a and the external tooth 32a is released, the top end surface 32e of the protrusion 32d is located more radially inward than the top end surface of the restricting portion 28d located radially inward, that is, located more radially outward than the top end surfaces of the first and second stopper portions 28b and 28c located radially inward (see FIG. 4B). Therefore, the rotational angle of the upper plate 26 relative to the lower plate 21 is kept at a corresponding predetermined angle as a result that the first or second stopper portion 28b or 28c opposed in a circumferential direction of the protrusion 32d of each pole disposed on the lower plate 21 is brought into contact with the upper plate 26 (see FIGS. 4B and 4C).

Especially, as shown in FIG. 4B, in the state where the second stopper portion 28c is located in the vicinity of the protrusion 32d, the restricting portion 28d is opposed to the top end surface 32e of the protrusion 32d. Therefore, in this state, the protrusion 32d is brought into contact with the restricting portion 28d so that the movement in the radial direction of the pole 32 is restricted and the engagement between the internal tooth 27a and the external tooth 32a is disabled. At this time, the permissive state of the rotation of the upper plate 26 relative to the lower plate 21 is kept as it is.

As shown in FIG. 4B, the state where the rotation of the upper plate 26 in the illustrated counterclockwise direction by the pole 32 (protrusion 32d) is restricted corresponds to a forward tilted state where the seatback frame 12 is rotated to the foremost position relative to the seat cushion frame 11. On the other hand, as shown in FIG. 4C, the state where the rotation of the upper plate 26 in the illustrated clockwise direction by the pole 32 (protrusion 32d) is restricted corresponds to a rearward tilted state where the seatback frame 12 is rotated to the rearmost position relative to the seat cushion frame 11. Specifically, in the forward tilted state, the permissive state of the rotation of the upper plate 26 relative to the lower plate 21 is kept as it is, and the rearward rotation of the seatback frame 12 is permitted. On the other hand, in the rearward tilted state, the rotation of the upper plate 26 relative to the lower plate 21 is restricted and the rotational angle of the seatback frame 12 is firmly kept as it is.

As shown in FIG. 2, at the center of the lower plate 21, that is, on the inner circumferential side of the through hole 21a, a spring 33 formed by winding a wire member having a constant cross section in the shape of a substantially rectangle into a spiral shape is accommodated. The spring 33 is wound from the inner peripheral side toward the outer peripheral side in the illustrated counterclockwise direction. The one end 33a thereof located at the outer peripheral side is bent radially outward to be passed through a locking hole 21b of the lower plate 21 and locked therein. The other end 33b thereof located at the inner peripheral side is bent radially inward to be passed through the groove portion 31e of the cam 31 and locked therein (see FIG. 3). The spring 33 is wound around the rotational axis O of the cam 31, that is, around the outer peripheral side of the projected wall portion 31c in such a manner that the engagement hole 31d is released in the axial direction. The spring 33 biases the cam 31 in such a manner that the cam rotates toward the other side of the lower plate 21 (in the counterclockwise direction in FIG. 2), that is, the restricted state of the rotation of the upper plate 26 relative to the lower plate 21 is set.

As a result, the cam 31 keeps the upper plate 26 into the rotation restricted state relative to the lower plate 21 basically via each pole 32, and keeps the seatback frame 12 into the rotation restricted state relative to the seat cushion frame 11. When the cam 31 rotates in the illustrated clockwise direction relative to the lower plate 21 against the biasing force of the spring 33, the cam 31 switches to the permissive state of the rotation of the upper plate 26 relative to the lower plate 21. As has already been described, when the operational force by the cam 31 is released, if the restricting portion 28d is opposed to the top end surface 32e of the protrusion 32d of the pole 32, the permissive state of the rotation of the upper plate 26 relative to the lower plate 21 is kept as it is, regardless of the biasing force by the spring 33.

A connection shaft 34 made of metallic bar to be sequentially inserted into the seat cushion frame 11, the through hole 21a of the lower plate 21 accommodating the spring 33, the engagement hole 31d of the cam 31, and the shaft penetrating hole 26a of the upper plate 26 in this order has a flange 34a extending outward. The connection shaft 34 also comprises an engagement portion 34b projected from the flange 34a toward one side in the axial direction (toward the side of the seat cushion frame 11) and engaged with the engagement hole 31d having an oval shape in its cross section, and a connecting portion 34c continuous to the engagement portion 34b and further projected beyond the engagement portion 34b toward one side in the axial direction in the state where the engagement portion 34b and the connecting portion 34c are integrated into one piece unit. An annular push nut 35 is mounted on the top end portion of the connection shaft projecting from the shaft penetrating hole 26a, so that the connection shaft 34 is positioned in the axial direction relative to the flange 34a close to the seat cushion frame 11. At this time, the engagement portion 34b is located at a position aligned to the position of the engagement hole 31d in the axial direction (see FIG. 3), and is connected with the cam 31 to rotate integrally with the cam 31.

Further, the connection shaft 34 is connected, at its connecting portion 34c, with the corresponding connecting portion 34c opposed to the connection shaft 34, which is the other pair of the connecting portion 34c in such a manner that the connection shaft 34 rotates integrally with the connecting portion 34c. Thus, as the connection shafts 34 at the opposite sides interlock with each other to rotate, the cams 31 at both sides engaged with each other at the engagement portion 34b and the engagement portion 34b of the connections shafts 34 corresponding to each other also integrally rotate.

Further, the connection shaft 34 is integrally formed with an attachment portion 34d projected from the flange 34a toward the other side in the axial direction (the opposite side of the sea cushion frame 11.) To the connection shaft 34 at one side shown in FIG. 2, an operation lever 36 is mounted through which the attachment portion 34d is passed so as to integrally rotate with the connection shaft 34. The operation lever 36 is to apply an operation force for rotating both cams 31 in the illustrated clockwise direction relative to the lower plate 21 against the spring 33 via the connection shaft 34, that is, an operation force for switching the upper plate 26 into the state where its rotation relative to the lower plate 21 is allowed.

As described above in detail, according to this embodiment, the following effect can be obtained.

(1) In this embodiment, the protrusion 32d of each pole 32 is brought into contact with the restricting portion 28d, so that the engagement between the internal tooth 27a and the external tooth 32a is disabled, whereas the permissive state of the rotation of the upper plate 26 relative to the lower plate 21 kept as it is. On the other hand, the protrusion 32d of each pole 32 is brought into contact with the first stopper portion 28b or the second stopper portion 28c, so that the rotational angle of the upper plate 26 relative to the lower plate 21 is kept at each corresponding predetermined angle. In this case, since all of the plurality of poles 32 are in the identical shape, there is no need of preparing plural kinds of poles for achieving the rotational operations of the lower plate 21 and the upper plate 26. Thus, an increase in the number of the kinds of parts can be suppressed, and in turn, cost reduction can be achieved.

(2) In this embodiment, when the permissive state (unlocked state) of the rotation of the upper plate 26 relative to the lower plate 21 is kept as it is, each protrusion 32d and the restricting portion 28d are simultaneously brought into contact with each other, and the engagements of the external teeth 32a of all of the poles 32 and the internal teeth 27a of the upper plate 26 are individually disabled. Thus, the interference between the external teeth 32a of the poles 32 and the internal teeth 27a of the upper plate 26 can be prevented more assuredly, and as a result, excellent operability can be obtained.

(3) In this embodiment, in the state where the rotational angle of the upper plate 26 relative to the lower plate 21 is kept at a predetermined angle, the each protrusion 32d and the stopper portion (the first or second stopper portion 28b or 28c) are simultaneously brought into contact with each other. Thus, the plurality of protrusions 32d and the stopper portions share the operation of keeping the state described above. Thus, the rotational angle of the upper plate 26 relative to the lower plate 21 can be kept at a predetermined angle more reliably.

(4) In this embodiment, the first protrusion (protrusion 32d) for keeping the permissive state of the rotation of the upper plate 26 relative to the lower plate 21 also serves as a second protrusion for keeping the rotational angle of the upper plate 26 relative to the lower plate 21 at a predetermined angle. Thus, the shape of the poles 32 can be more simplified.

Second Embodiment

Hereinafter, a second embodiment which embodies the present invention will now be described with reference to the drawings. The second embodiment differs from the first embodiment in that each pole is formed with a protrusion (a first protrusion) for keeping the permissive state of the rotation of the upper plate relative to the lower plate, and a protrusion (second protrusion) for keeping the rotational angle of the upper plate relative to the lower plate at a predetermined angle wherein the first protrusion and the second protrusion are separately provided, and that a restricting portion of the upper plate also serves as a stopper portion. Thus, detailed descriptions of the structures of the second embodiment identical to those of the first embodiment will be omitted.

Figure 5A:
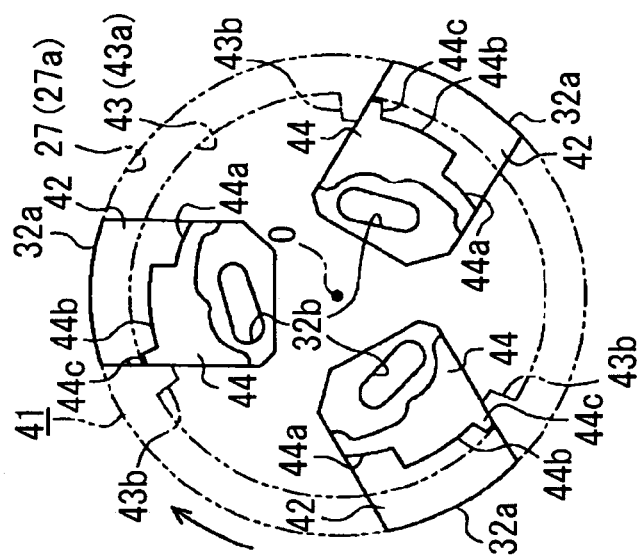
FIG. 5A is a front view schematically showing a second embodiment of the present invention.
Figure 5B:
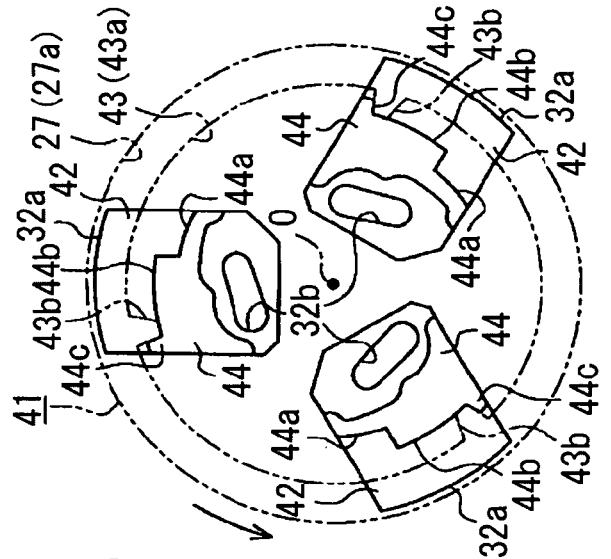
FIG. 5B is a front view schematically showing the second embodiment.
Figure 5C:
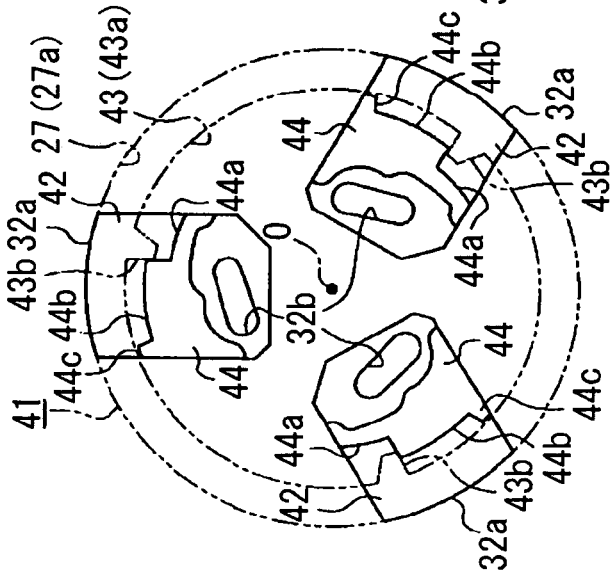
FIG. 5C is a front view schematically showing the second embodiment.

FIGS. 5A-5C is a front view schematically showing an upper plate 41 and a pole 42 of this embodiment. As shown in FIGS. 5A-5C, a recessed portion 43 is formed at an inner peripheral side of an internal tooth 27a in the recessed portion 27 of the upper plate 41. The recessed portion 43 is further recessed into a circular shape concentric with the recessed portion 27 and having an inner diameter smaller than the inner diameter of the recessed portion 27. Further, the upper plate 41 includes a plurality of (three) engagement portions 43b formed to be projected from the inner peripheral surface 43a of the recessed portion 43 radially inward at an interval with an equal angle (120 degrees), and serving as restricting portions and stopper portions.

On the other hand, each pole 42 located in a guide groove 24 of the lower plate 21 is disposed between engagement portions 43b adjacent to each other in the circumferential direction. An intermediate portion 44 between the base end portion formed with the cam hole 32b and the top end portion formed with the external teeth 32a is dislocated in the axial direction from the top end portion in such a manner that the intermediate portion 44 is substantially in flush with the base end portion. Then, the inner peripheral surface 43a of the recessed portion 43 is opposed to the intermediate portion 44 in the radial direction. Specifically, the position of the intermediate portion 44 in the axial direction overlaps with the position of the inner peripheral surface 43a in the axial direction. The intermediate portion 44 has an arc-shaped outer peripheral surface 44a at its one side in the circumferential direction (at the side in the clockwise direction in FIG. 5A). The intermediate portion 44 also has a first protrusion 44b and a second protrusion 44c formed continuously with the other side of the outer peripheral surface 44a in the circumferential direction (the side in the counterclockwise direction in FIGS. 5A-5C) and to be projected more radially outward than the outer peripheral surface 44a. The length of projection extending radially outward of the first protrusion 44b is set to be shorter than the length of projection extending radially outward of the second protrusion 44c. Specifically, the first and second protrusions 44b and 44c are formed to be projected radially outward to create a stepwise structure.

As shown in FIG. 5A, in the state where the pole 42 projects in the radial direction, that is, in the state where the internal tooth 27a and the external tooth 32a engage with each other, the outer peripheral surface 44a is located more radially inward than the top end surface of the engagement portion 43b located radially inward, and the top end surface of the first protrusion 44b located radially outward is located more radially outward than the top end surface of the engagement portion 43b located radially inward, and the top end surface of the second protrusion 44c located radially outward is located more radially inward than the inner peripheral surface 43a.

On the other hand, in the state where the pole 42 is retracted in a radial direction, that is, in the released state of the engagement between the internal tooth 27a and the external tooth 32a, the top end surface of the first protrusion 44b located radially outward is located more radially inward than the top end surface of the engagement portion 43b located radially inward, and the top end surface of the second protrusion 44c located radially outward is located more radially outward than the top end surface of the engagement portion 43b located radially inward (see FIG. 5B). Therefore, the rotational angle of the upper plate 41 relative to the lower plate 21 is kept at a corresponding predetermined angle as a result that the engagement portion 43b opposed in a circumferential direction to the second protrusion 44c of each pole 42 disposed on the lower plate 21 is brought into contact with the upper plate 41 (see FIGS. 5B and 5C).

Especially, as shown in FIG. 5B, in the state where the engagement portion 43b is located in the vicinity of the second protrusion 44c at the side of the first protrusion 44b, the engagement portion 43b is opposed to the top end surface of the first protrusion 44b. Therefore, in this state, the first protrusion 44b is brought into contact with the engagement portion 43b so that the movement in the radial direction of the pole 42 is restricted and the engagement between the internal tooth 27a and the external tooth 32a is disabled. At this time, the permissive state of the rotation of the upper plate 41 relative to the lower plate 21 is kept as it is.

As shown in FIG. 5B, the restricted state of the rotation of the upper plate 41 in the illustrated counterclockwise direction by the pole 32 (second protrusion 44c) corresponds to a forward tilted state where the seatback frame 12 is rotated to the foremost position relative to the seat cushion frame 11. On the other hand, as shown in FIG. 5C, the restricted state of the rotation of the upper plate 41 in the illustrated clockwise direction by the pole 42 (second protrusion 44c) corresponds to a rearward tilted state where the seatback frame 12 is rotated to the rearmost position relative to the seat cushion frame 11. Specifically, in the forward tilted state, the permissive state of the rotation of the upper plate 41 relative to the lower plate 21, and the rearward rotation of the seatback frame 12 is permitted. On the other hand, in the rearward tilted state, the rotation of the upper plate 41 relative to the lower plate 21 is restricted and the rotational angle of the seatback frame 12 is firmly kept as it is.

As described above in detail, according to this embodiment, the following effect can be obtained as well as the effects (1) to (3) achieved in the first embodiment.

(1) In this embodiment, the restricting portion (engagement portion 43b) for keeping the permissive state of the rotation of the upper plate 41 relative to the lower plate 21 also serves as a stopper portion for keeping the rotational angle of the upper plate 41 relative to the lower plate 21 at a predetermined angle. As a result, the shape of the upper plate 41 can be more simplified.

Third Embodiment

Hereinafter, a third embodiment which embodies the present invention will now be described with reference to the drawings. The third embodiment differs from the first and second embodiments in that a protrusion for keeping the permissive state of the rotation of the upper plate relative to the lower plate (first protrusion) and a restricting portion to be engaged therewith are arranged and created at positions in the axial direction different from those of a protrusion for keeping the rotational angle of the upper plate relative to the lower plate at a predetermined angle (second protrusion) and a stopper portion to be engaged therewith. Thus, detailed descriptions of the structures of the third embodiment identical to those of the first and second embodiments will be omitted.

Figure 6:
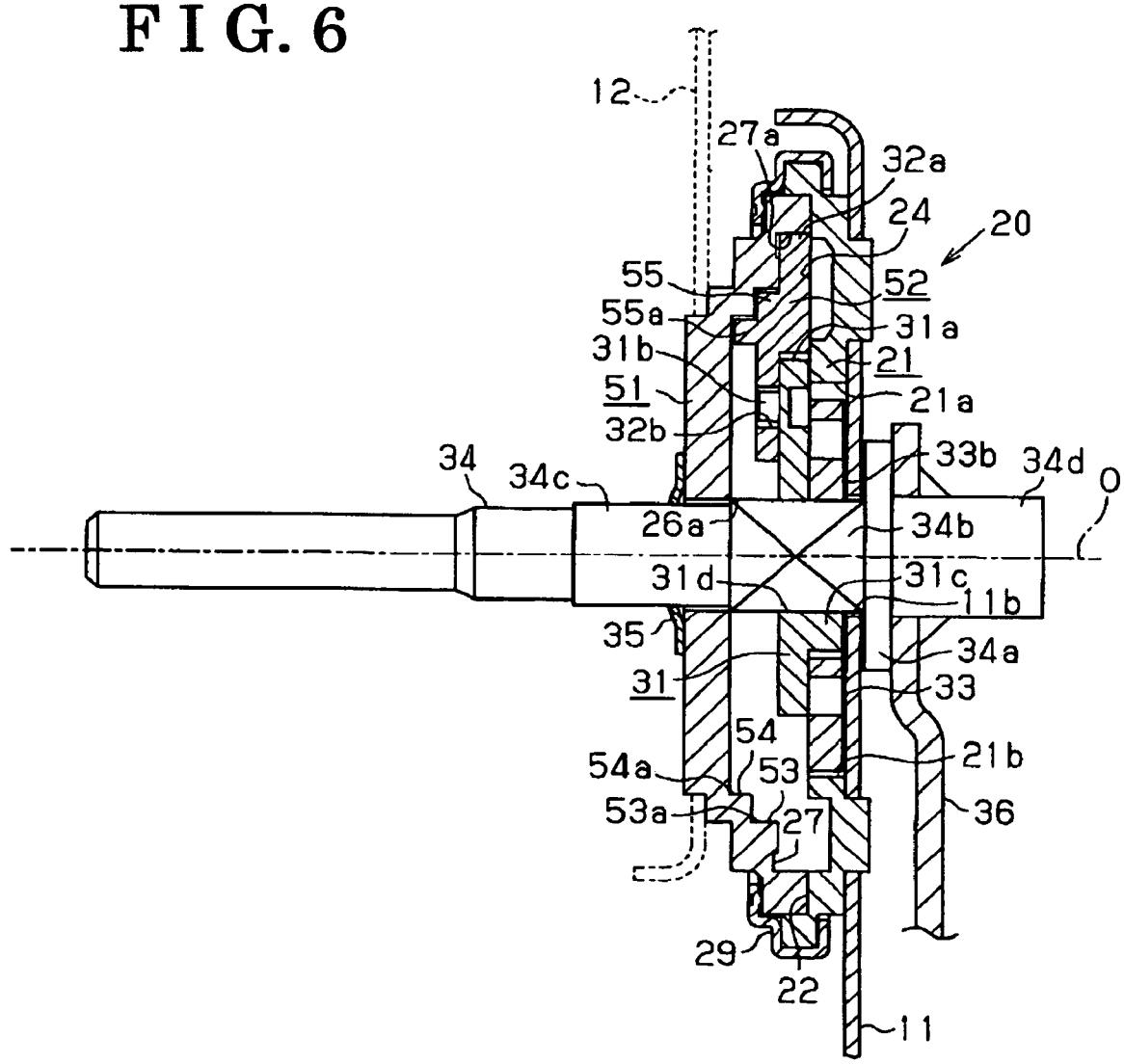
FIG. 6 is a cross-sectional view showing a third embodiment of the present invention.
Figure 7:
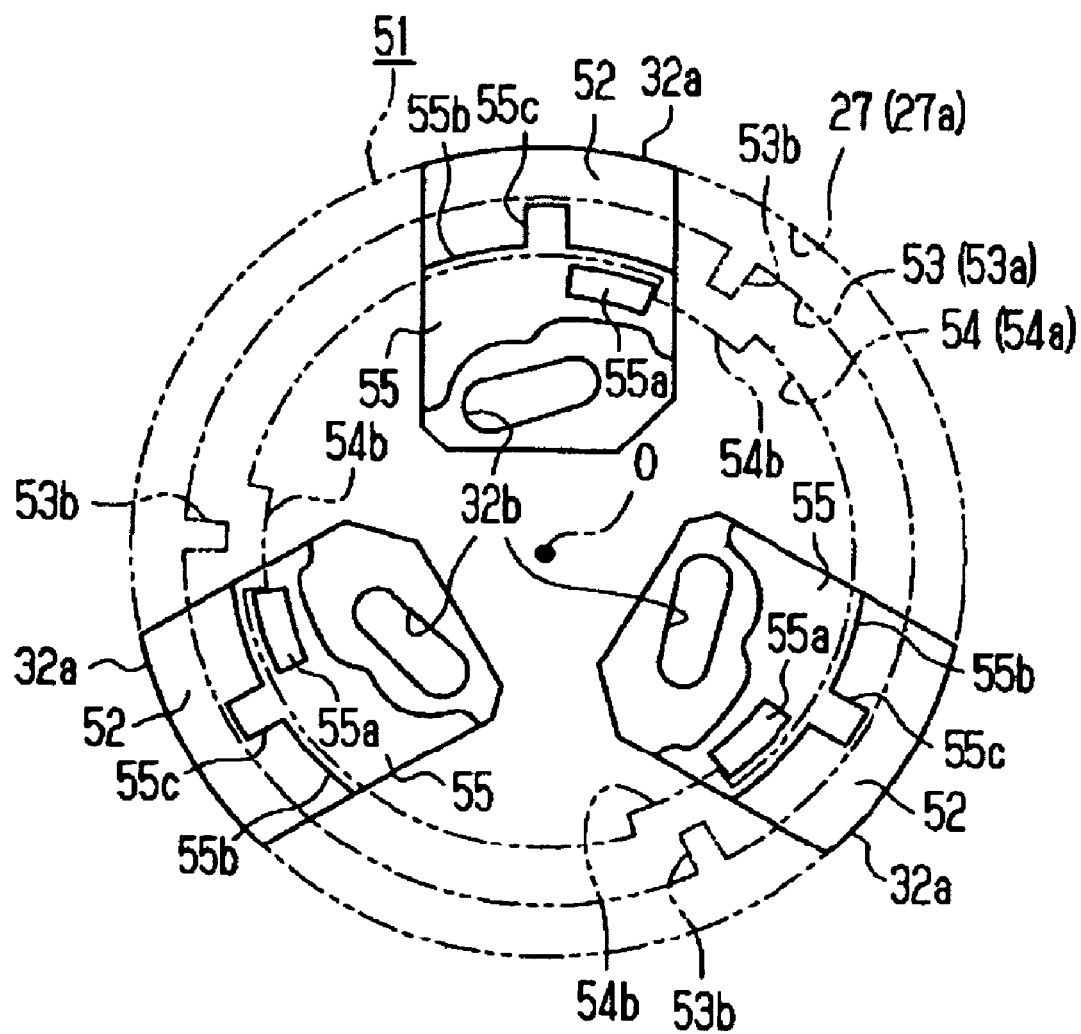
FIG. 7 is a front view schematically showing the third embodiment.

FIG. 6 is a cross-sectional view showing a seat reclining apparatus for a vehicle according to this embodiment FIG. 7 is a front view schematically showing an upper plate 51 and a pole 52. As shown in FIGS. 6 and 7, a first recessed portion 53 is formed at an inner peripheral side of an internal tooth 27a in the recessed portion 27 of the upper plate 51. The first recessed portion 53 is formed to be further recessed into a circular shape concentric with the recessed portion 27 in the axial direction and having an inner diameter smaller than the inner diameter of the recessed portion 27. Further, as shown in FIG. 7, the upper plate 51 comprises a plurality of (three) stopper portions 53b formed to be projected from the inner peripheral surface 53a of the first recessed portion 53 radially inward at an interval with an equal angle (120 degrees). Further, a second recessed portion 54 is formed in the first recessed portion 53. The second recessed portion 54 is located at an inner peripheral side of the stopper portion 53b. The second recessed portion 54 is formed to be further recessed into a circular shape concentric with the first recessed portion 53 and having an inner diameter smaller than the inner diameter of the first recessed portion 53. Further, the upper plate 51 comprises a plurality of (three) restricting portions 54b formed to be projected from the inner peripheral surface 54a of the second recessed portion 54 radially inward at an interval with an equal angle (120 degrees). The restricting portion 54b is arranged and created in such a manner that the angular position at its center in the circumferential direction coincides with the angular position at the center of the stopper portion 53b in the circumferential direction. The width of the restricting portion 54b is set to be larger than the width of the stopper portion 53b in the circumferential direction. Further, the length of projection extending radially inward of the restricting portion 54b is set to be larger than the length of projection extending radially inward of the stopper portion 53b.

On the other hand, each pole 52 located in a guide groove 24 of the lower plate 21 is disposed between the stopper portions 53b adjacent to each other in the circumferential direction. An intermediate portion 55 between the base end portion formed with the cam hole 32b and the top end portion formed with the external teeth 32a is dislocated in the axial direction from the top end portion in such a manner that the intermediate portion 55 is substantially in flush with the base end portion (see FIG. 6). Then, the inner peripheral surface 53a of the recessed portion 53 is opposed to the intermediate portion 55 in the radial direction. Specifically, the position of the intermediate portion 55 in the axial direction overlaps with the position of the inner peripheral surface 53a in the axial direction.

On one side of the intermediate portion 55 in the circumferential direction (on the side in the clockwise direction in FIG. 7), a first protrusion 55a is formed to project to be parallel to the axial direction, utilizing the space created at the side of the second recessed portion 54. That is, the position in the axial direction of the first protrusion 55a overlaps with the position in the axial direction of the inner peripheral surface 54a (see FIG. 6). The intermediate portion 55 comprises an arc-shaped outer peripheral surface 55b, and a second protrusion 55c formed to be projected radially outward from the center in the circumferential direction of the outer peripheral surface 55b.

As shown in FIG. 7, in the state where the pole 52 projects in a radial direction, that is, in the state where the internal tooth 27a and the external tooth 32a engage with each other, the top end surface of the first protrusion 55a located radially outward is located more radially inward than the inner peripheral surface 54a as well as is located more radially outward than the top end surface of the restricting portion 54b located radially inward. Further, the top end surface of the second protrusion 55c located radially outward is located more radially inward than the inner peripheral surface 53a as well as is located more radially outward than the top end surface of the stopper portion 53b located radially inward. Further, the outer peripheral surface 55b is located more radially inward than the top end surface of the stopper portion 53b located radially inward.

On the other hand, in the state where the pole 52 is retracted in a radial direction, that is, in the released state of the engagement between the internal tooth 27a and the external tooth 32a, the top end surface of the first protrusion 55a is located more radially inward than the top end surface of the restricting portion 54b located radially inward, and the top end surface of the second protrusion 55c located radially outward is located more radially outward than the top end surface of the stopper portion 53b located radially inward. Therefore, the rotational angle of the upper plate 51 relative to the lower plate 21 is kept at a corresponding predetermined angle as a result that the stopper portion 53b opposed in a circumferential direction of the second protrusion 55c of each pole 52 disposed on the lower plate 21 is brought into contact with the upper plate 51.

Especially, in the state where the stopper portion 53b is located in the vicinity of the second protrusion 55c at the side of the first protrusion 55a, the restricting portion 54b is opposed to the top end surface of the first protrusion 55a. Therefore, in this state, the first protrusion 55a is brought into contact with the restricting portion 54b so that the movement in the radial direction of the pole 52 is restricted and the engagement between the internal tooth 27a and the external tooth 32a is disabled. At this time, the permissive state of the rotation of the upper plate 51 relative to the lower plate 21 is kept as it is.

The restricted state of the rotation of the upper plate 51 in the illustrated counterclockwise direction by the pole 52 (second protrusion 55c) corresponds to a forward tilted state where the seatback frame 12 is rotated to the foremost position relative to the seat cushion frame 11. On the other hand, the restricted state of the rotation of the upper plate 51 in the illustrated clockwise direction by the pole 52 (second protrusion 55c) corresponds to a rearward tilted state where the seatback frame 12 is rotated to the rearmost position relative to the seat cushion frame 11. Specifically, in the forward tilted state, the permissive state of the rotation of the upper plate 51 relative to the lower plate 21 is kept as it is, and the rearward rotation of the seatback frame 12 is permitted. On the other hand, in the rearward tilted state, the rotation of the upper plate 51 relative to the lower plate 21 is restricted and the rotational angle of the seatback frame 12 is firmly kept as it is.

As described above in detail, according to this embodiment, the following effect can be obtained as well as the effects (1) to (3) achieved in the first embodiment.

(1) In this embodiment, the restricting portion 54b and the stopper portion 53b are formed on the upper plate 51 with their positions in the axial direction different from each other. Thus, the contact between the first protrusion 55a and the restricting portion 54b is made at a position different in the axial direction from the position of contact between the second protrusion 55c and the stopper portion 53b is made. Due to this structure, the interference between the operations related to these contacts (the maintenance of the permissive state of the rotation of the upper plate 51 relative to the lower plate 21, and the retention of the rotational angle of the upper plate 51 relative to the lower plate 21 at a predetermined angle) can be preferably suppressed.

Fourth Embodiment

Hereinafter, a fourth embodiment which embodies the present invention will now be described with reference to the drawings. The fourth embodiment differs from the third embodiment in that the cam hole of the pole through which the projection 31b of the cam 31 is inserted is formed in a half-blanked state without being penetrated into the thickness direction, and that a protrusion (first protrusion) for keeping the permissive state of the rotation of the upper plate relative to the lower plate at the half-blanked outer wall surface on which the cam hole is created. Thus, detailed descriptions of the structures of the fourth embodiment identical to those of the third embodiment will be omitted.

Figure 8:
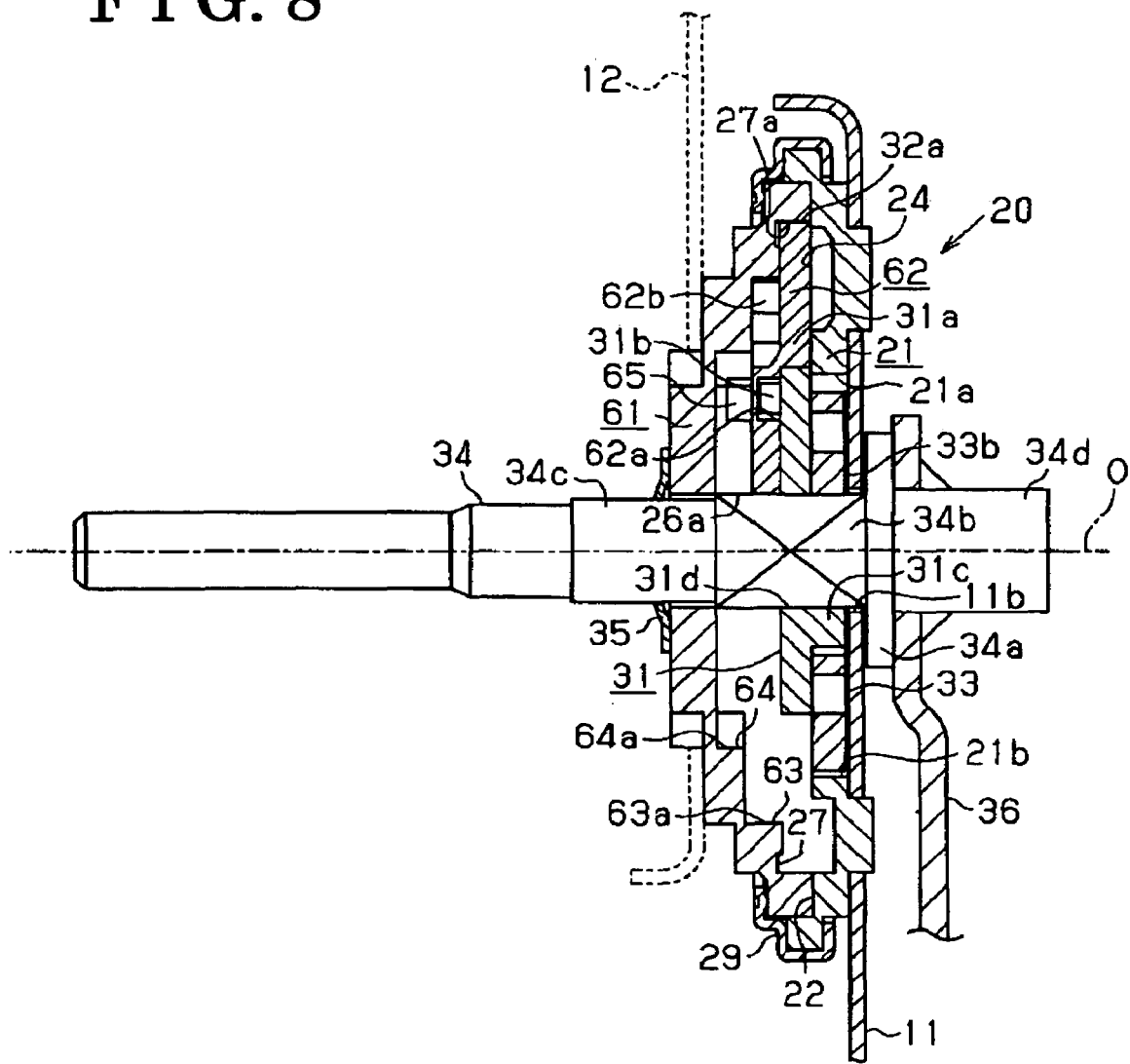
FIG. 8 is a cross-sectional view showing a fourth embodiment of the present invention.
Figure 9:
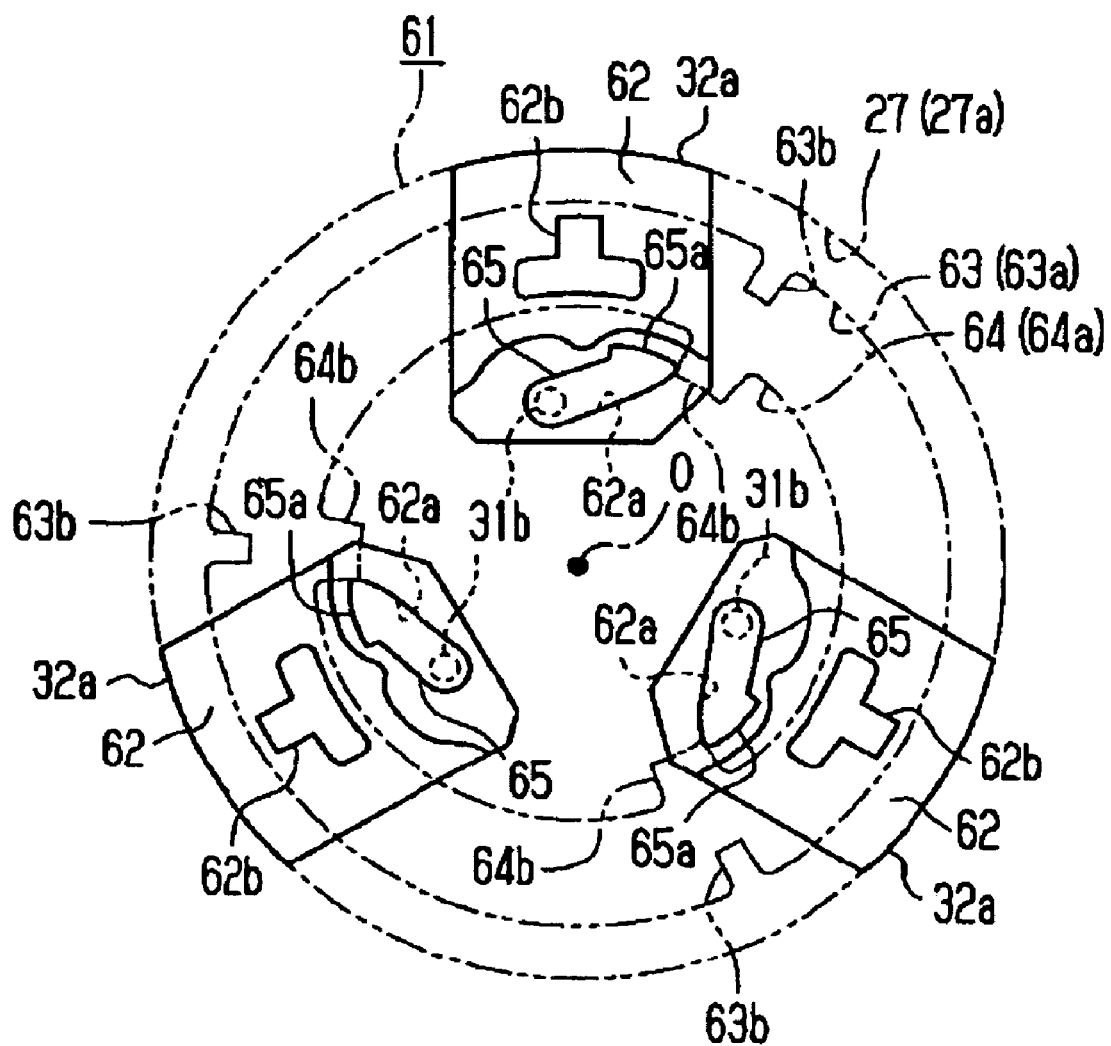
FIG. 9 is a front view schematically showing the fourth embodiment.

FIG. 8 is a cross-sectional view showing a seat reclining apparatus for a vehicle of this embodiment FIG. 9 is a front view schematically showing an upper plate 61 and a pole 62. As shown in FIGS. 8 and 9, a first recessed portion 63 is formed at an inner peripheral side of an internal tooth 27a in the recessed portion 27 of the upper plate 61. The first recessed portion 63 is further recessed into a circular shape concentric with the recessed portion 27 and having an inner diameter smaller than the inner diameter of the recessed portion 27. Further, as shown in FIG. 9, the upper plate 61 comprises a plurality of (three) stopper portions 63b formed to be projected from the inner peripheral surface 63a of the first recessed portion 63 radially inward at an interval with an equal angle (120 degrees). Further, a second recessed portion 64 is formed at an inner peripheral side of the stopper portion 63b in the first recessed portion 63. The second recessed portion 64 is further recessed into a circular shape concentric with the first recessed portion 63 and having an inner diameter smaller than the inner diameter of the first recessed portion 63. Further, the upper plate 61 comprises a plurality of (three) restricting portions 64b formed to be projected from the inner peripheral surface 64a of the second recessed portion 64 radially inward at an interval with an equal angle (120 degrees). The restricting portion 64b is arranged and created in such a manner that the angular position at its center in the circumferential direction coincides with the angular position at the center of the stopper portion 63b in the circumferential direction. The width of the restricting portion 64b is set to be larger than the width of the stopper portion 63b in the circumferential direction. Further, the length of projection extending radially inward of the restricting portion 64b is set to be larger than the length of projection radially inward of the stopper portion 63b.

On the other hand, the pole 62 located in a guide groove 24 of the lower plate 21 is disposed between stopper portions 63b adjacent to each other in the circumferential direction. On the base end portion thereof, a cam hole 62a formed into a half-blanked state is created. The cam hole 62a is tilted toward the circumferential direction about the rotational axis O. The pole 62 is engaged with the cam hole 62a by inserting a projection 31b of the cam 31 into the cam hole 62a.

Figure 10B:
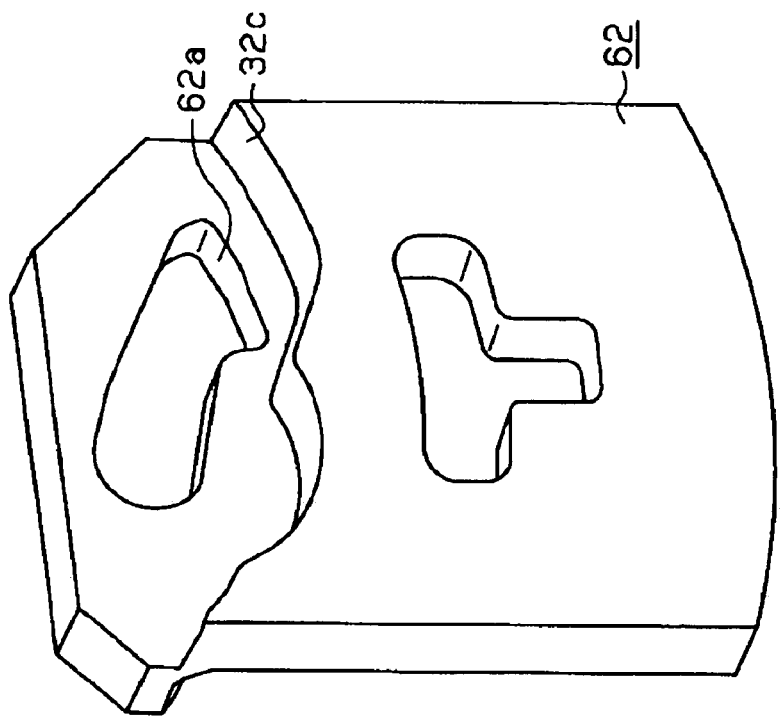
FIG. 10B is a perspective view showing the pole.
Figure 10A:
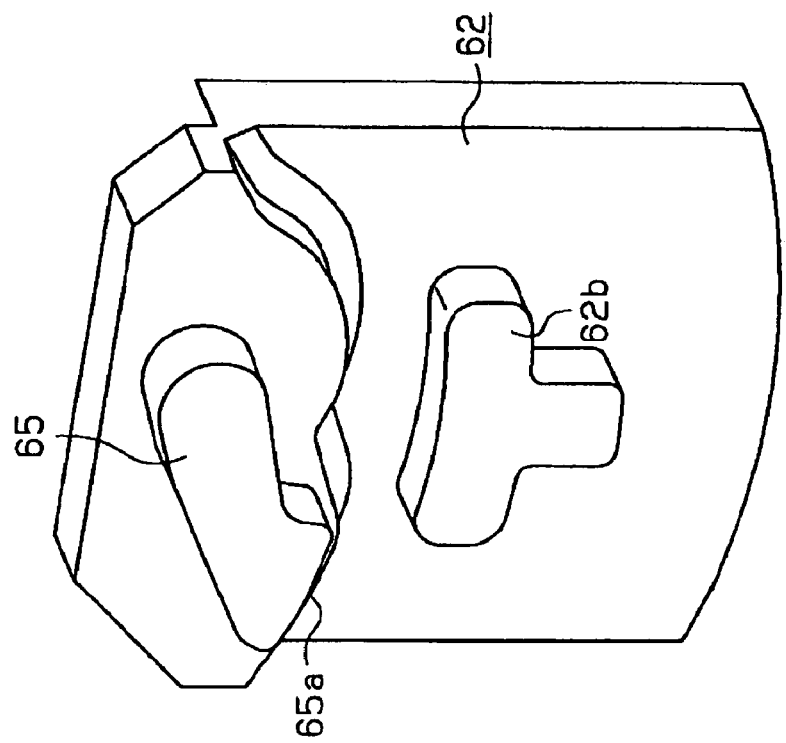
FIG. 10A is a perspective view showing a pole.

In this context, as shown in FIG. 8, the base end portion of the pole 62 formed with the cam hole 62b is dislocated from the top end portion formed on the external tooth 32a in the axial direction, and an inner peripheral surface 63a of the recessed portion 63 is opposed thereto in the radial direction. Further, shown in both of FIGS. 10A and 10B, on the base end portion of the pole 62, a first protrusion 65 formed by an outer wall surface into a half-blanked state to create a cam hole 62a is formed. The first protrusion 65 is formed to be projected to be parallel to the axial direction, utilizing the space created at the side of the second recessed portion 64. Specifically, the position in the axial direction of the first protrusion 65 overlaps with the position in the axial direction of the inner peripheral surface 64a (see FIG. 8). The top end surface located radially outward of the first protrusion 65 forms an arc-shaped outer peripheral surface 65a about a rotational axis O. The outer peripheral surface 65a is disposed at one side of the pole 62 in the circumferential direction (at the side in the clockwise direction in FIG. 9) corresponding to the cam hole 62a.

On the top end portion of the pole 62, the second protrusions 62b are formed to be parallel to the axial direction, utilizing the space formed at the side of the first recessed portion 63. Specifically, the position in the axial direction of the second protrusion 62b overlaps with the position in the axial direction of the inner peripheral surface 63a (see FIG. 8).

As shown in FIG. 9, in the state where the pole 62 projects in the radial direction, that is, in the state where the internal tooth 27a and the external tooth 32a engage with each other, the outer peripheral surface 65a of the first protrusion 65 is located more radially inward than the inner peripheral surface 64a, as well as is located more radially outward than the top end surface of the restricting portion 64b located radially inward. Further, the top end surface of the second protrusion 62b located radially outward is located more radially inward than the inner peripheral surface 63a, as well as is located more radially outward than the top end surface of the stopper portion 63b located radially inward.

On the other hand, in the state where the pole 62 is retracted in a radial direction, that is, in the released state of the engagement between the internal tooth 27a and the external tooth 32a, the outer peripheral surface 65a of the first protrusion 65 is located more radially inward than the top end surface of the restricting portion 64b located radially inward, and the top end surface of the second protrusion 62b located radially outward is located more radially outward than the top end surface of the stopper portion 63b located radially inward. Therefore, the rotational angle of the upper plate 61 relative to the lower plate 21 is kept at a corresponding predetermined angle as a result that the stopper portion 63b opposed in a circumferential direction of the second protrusion 62b of each pole 62 disposed on the lower plate 21 is brought into contact with the upper plate 61.

Especially, in the state where the stopper portion 63b is located in the vicinity of the second protrusion 62b at the side of the first protrusion 65 (outer peripheral surface 65a), the restricting portion 64b is opposed to the outer peripheral surface 65a of the first protrusion 65. Therefore, in this state, the first protrusion 65 is brought into contact with the restricting portion 64b so that the movement in the radial direction of the pole 62 is restricted and the engagement between the internal tooth 27a and the external tooth 32a is disabled. At this time, the permissive state of the rotation of the upper plate 61 relative to the lower plate 21 is kept as it is.

The restricted state of the rotation of the upper plate 61 in the illustrated counterclockwise direction by the pole 62 (second protrusion 62b) corresponds to a forward tilted state where the seatback frame 12 is rotated to the foremost position relative to the seat cushion frame 11. On the other hand, the restricted state of the rotation of the upper plate 61 in the illustrated clockwise direction by the pole 62 (second protrusion 62b) corresponds to a rearward tilted state where the seatback frame 12 is rotated to the rearmost position relative to the seat cushion frame 11. Specifically, in the forward tilted state, the permissive state of the rotation of the upper plate 61 relative to the lower plate 21, and the rearward rotation of the seatback frame 12 is permitted. On the other hand, in the rearward tilted state, the rotation of the upper plate 61 relative to the lower plate 21 is restricted and the rotational angle of the seatback frame 12 is firmly kept as it is.

As described above in detail, according to this embodiment, the following effect can be obtained as well as the effects (1) to (3) achieved in the third embodiment.

(1) In this embodiment, the first protrusion 65 is provided on an outer wall surface formed into a half-blanked state to create the cam hole 62a. Due to this structure, as compared with the case where the first protrusion and the cam hole are separately arranged and created for example, the shape of the pole 62 can be further simplified.

Fifth Embodiment

Hereinafter, a fifth embodiment which embodies the present invention will now be described with reference to the drawings. The fifth embodiment differs from the third embodiment in that the stopper portions for keeping the rotational angle of an upper plate relative to a lower plate at a predetermined angle are constituted by a plurality of second recessed portions formed in a first recessed portion into a recessed shape for each of predetermined angles. Thus, detailed descriptions of the structures of the fifth embodiment identical to those of the third embodiment will be omitted.

Figure 11:
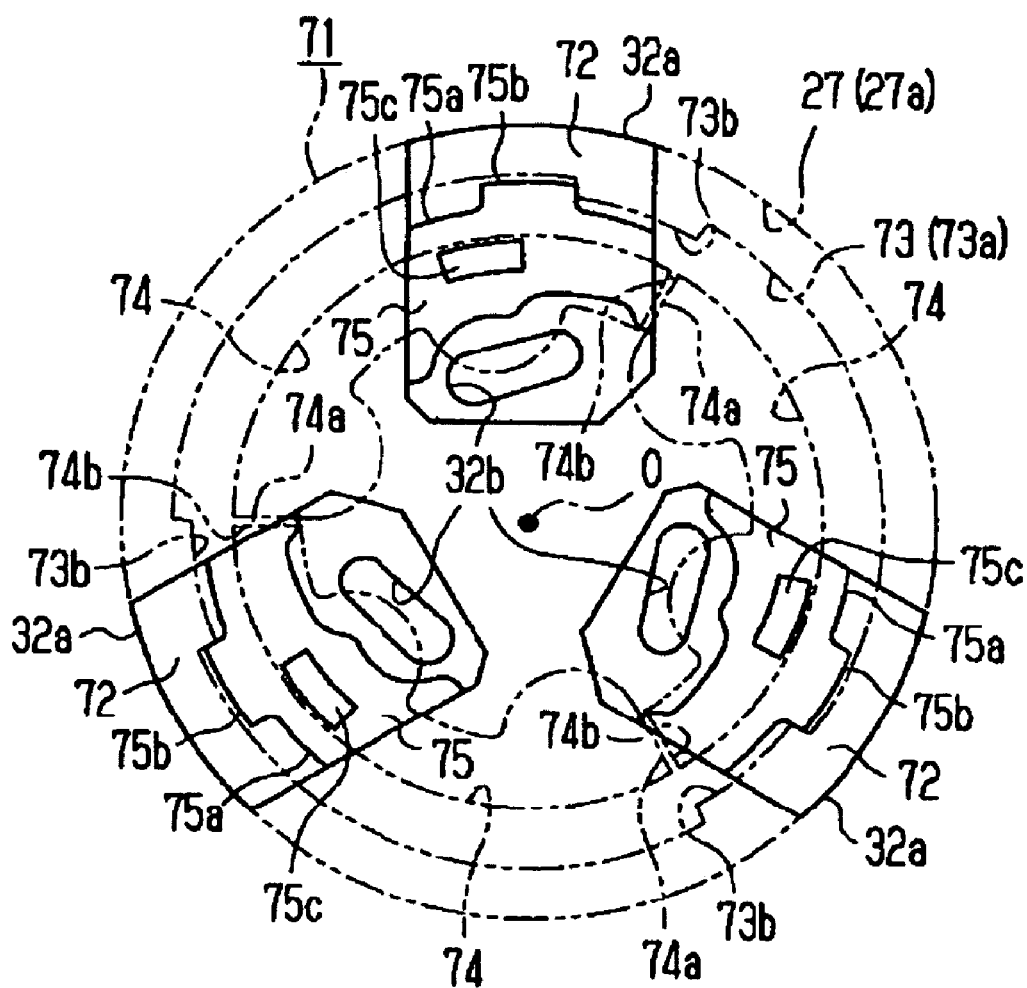
FIG. 11 is a front view schematically showing a fifth embodiment of the present invention.

FIG. 11 is a front view schematically showing an upper plate 71 and a pole 72. As shown in FIG. 11, a first recessed portion 73 is formed at an inner peripheral side of an internal tooth 27a in the recessed portion 27 of the upper plate 71. The first recessed portion 73 is further recessed into a circular shape concentric with the first recessed portion 73 and having an inner diameter smaller than the inner diameter of the first recessed portion 73. Further, the upper plate 71 comprises a plurality of (three) restricting portions 73b formed to be projected from the inner peripheral surface 73a of the first recessed portion 73 radially inward at an interval with an equal angle (120 degrees). Further, a second recessed portion 74 is formed at the inner peripheral side in the restricting portion 73b in the first recessed portion 73. The second recessed portion 74 is further recessed into an arc shape concentric with the first recessed portion 73 in the axial direction and having an inner diameter smaller than the inner diameter of the first recessed portion 73. These second recessed portions 74 are disposed at an interval with an equal angle (120 degrees). Each inner wall surface at one side and the other side in a circumferential direction (in FIG. 11, the side in a counterclockwise direction and a side in a clockwise direction) of each second recessed portion 74 constitutes a third stopper portion 74a and a second stopper portion 74b, respectively. The restricting portion 73b is arranged and created in such a manner that the angular position at its center in the circumferential direction coincides with the angular position of the second stopper portion 74b.

On the other hand, each pole 72 located in a guide groove 24 of the lower plate 21 is disposed aligned with the second recessed portion 74 in a circumferential direction. An intermediate portion 75 between the base end portion formed with the cam hole 32b and the top end portion formed with the external teeth 32a is dislocated in the axial direction from the top end portion in such a manner that the intermediate portion 75 is substantially in flush with the base end portion. Then, the inner peripheral surface 73a of the first recessed portion 73 is opposed to the intermediate portion 75 in the radial direction. That is, the position of the intermediate portion 75 in the axial direction overlaps with the position of the inner peripheral surface 73a in the axial direction.

The intermediate portion 75 comprises an arc-shaped outer peripheral surface 75a, and a first protrusion 75b formed to be projected radially outward from the center of the outer peripheral surface 75a in the circumferential direction. At the other side of the intermediate portion 75 in the circumferential direction (at the side in the counterclockwise direction in FIG. 11), a second protrusion 75c is formed to be projected to be parallel to the axial direction utilizing the space created at the side of the second recessed portion 74. Specifically, the position in the axial direction of the second protrusion 75c overlaps with the position in the axial direction of the second recessed portion 74.

As shown in FIG. 11, in the state where the pole 72 projects in a radial direction, that is, in the state where the internal tooth 27a and the external tooth 32a engage with each other, the top end surface of the first protrusion 75b located radially outward is located more radially inward than the inner peripheral surface 73a as well as is located more radially outward than the top end surface of the restricting portion 73b located radially inward. Further, the top end surface of the second protrusion 75c located radially outward is located more radially inward than the inner peripheral surface of the second recessed portion 74 located radially outward as well as is located more radially outward than the inner peripheral surface of the second recessed portion 74 located radially inward. Further, the outer peripheral surface 75a is located more radially inward than the top end surface of the restricting portion 73b located radially inward.

On the other hand, in the state where the pole 72 is retracted in a radial direction, that is, in the released state of the engagement between the internal tooth 27a and the external tooth 32a, the top end surface of the first protrusion 75b located radially outward is located more radially inward than the top end surface of the restricting portion 73b located radially inward, and the top end surface of the second protrusion 75c located radially inward is located more radially outward than the inner peripheral surface of the second recessed portion 74 located radially inward. Therefore, the rotational angle of the upper plate 71 relative to the lower plate 21 is kept at a corresponding predetermined angle as a result that the first or second stopper portion 74a, 74b opposed in a circumferential direction of the second protrusion 75c of each pole disposed on the lower plate 21 are brought into contact with the upper plate 71.

Especially, in the state where the second stopper portion 74b is located in the vicinity of the second protrusion 75c, the restricting portion 73b is opposed to the top end surface of the first protrusion 75b. Therefore, in this state, the first protrusion 75b is brought into contact with the restricting portion 73b so that the movement in the radial direction of the pole 72 is restricted and the engagement between the internal tooth 27a and the external tooth 32a is disabled. At this time, the permissive state of the rotation of the upper plate 71 relative to the lower plate 21 is kept as it is.

As described above in detail, according to this embodiment, the following effect can be obtained as well as the effects (1) to (3) achieved in the first embodiment.

(1) In this embodiment, the restricting portion 73b and the first and the second stopper portions 74a, 74b (the second recessed portion 74) are formed on the upper plate 71 with their positions in the axial direction different from each other. Thus, the contact between the first protrusion 75b and the restricting portion 73b is made at a position different in the axial direction from the position of contact between the second protrusion 75c and the first or the second stopper portion 74a or 74b is made. Due to this structure, the interference between the operations related to these contacts (the maintenance of the permissive state of the rotation of the upper plate 71 relative to the lower plate 21, and the retention of the rotational angle of the upper plate 71 relative to the lower plate 21 at a predetermined angle) can be preferably suppressed.

Sixth Embodiment

Hereinafter, a sixth embodiment which embodies the present invention will now be described with reference to the drawings. The sixth embodiment differs from the first embodiment in that a projection (a second protrusion) for keeping the rotational angle of an upper plate relative to a lower plate at a predetermined angle is formed on the lower plate. Thus, detailed descriptions of the structures of the sixth embodiment identical to those of the first embodiment will be omitted.

Figure 12:
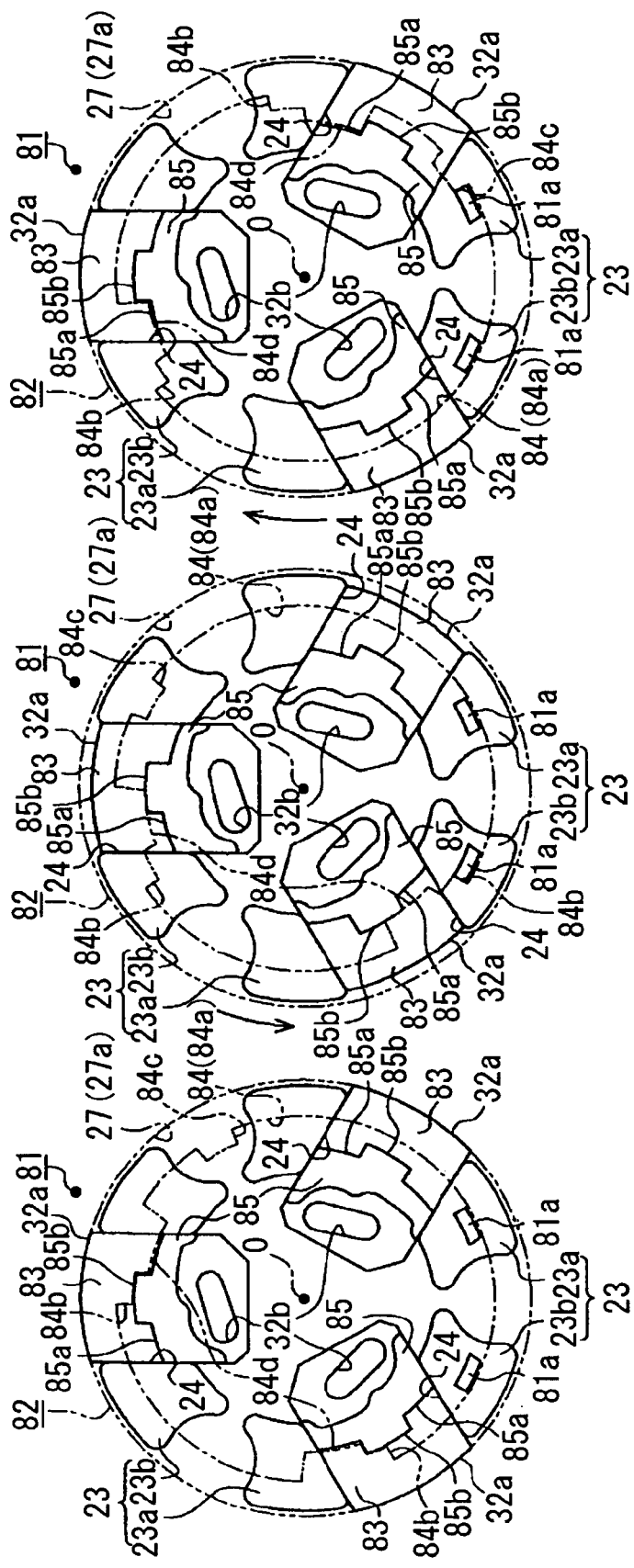
FIG. 12A is a front view schematically showing a sixth embodiment of the present invention.
FIG. 12B is a front view schematically showing the sixth embodiment.
FIG. 12C is a front view schematically showing the sixth embodiment.

FIGS. 12A-12C is a front view schematically showing a lower plate 81, an upper plate 82, and a pole 83. As shown in FIGS. 12A-12C, each of the molded portions 23a, 23b disposed at one side (at lower side in FIGS. 12A-12C) of the plurality of projections 23 provided to the lower plate 81 is formed with a second protrusion 81a projecting parallel to the axial direction. These second protrusions 81a are arranged in such a manner that the lower plate 81 and its mirror-reflected image are in an identical structure. In other words, the lower plate 81 is useable for both of the left and right lock mechanism which pairs up with each other in the width direction of the vehicle seat.

In the recessed portion 27 of the upper plate 82, a recessed portion 84 is formed at an inner peripheral side of an internal tooth 27a. The recessed portion 84 is further recessed into a circular shape concentric with the recessed portion 27 in the axial direction and having an inner diameter smaller than the inner diameter of the recessed portion 27. The upper plate 82 comprises a first stopper portion 84b and a second stopper portion 84c as stopper portions formed to be projected radially inward from an inner peripheral surface 84a of the recessed portion 84. The top end surface located radially outward of each second protrusion 81a is located more radially inward than the inner peripheral surface 84a, as well as is located more radially outward than the top end surfaces located radially inward of the first and second stopper portions 84b and 84c. The second protrusion 81a is formed to be projected utilizing the space created at the side of the recessed portion 84. Specifically, the position in the axial direction of the second protrusion 81a overlaps with the position in the axial direction of the inner peripheral surface 84a. Each of these second protrusions 81a is located at an angular position between the first and second stopper portions 84b and 84c.

Further, the upper plate 82 comprises a plurality of (two) restricting portions 84d formed to be projected radially inward from the inner peripheral surface 84a of the recessed portion 84 at an angular position between the first and the second stopper portions 84b and 84c at the side opposite to the side where the second protrusion 81a is disposed in the circumferential direction.

An intermediate portion 85 of the pole 83 located in the guide groove 24 of the lower plate 81 between the base end portion formed with the cam hole 32b and the top end portion formed with the external teeth 32a is dislocated in the axial direction from the top end portion in such a manner that the intermediate portion 85 is substantially in flush with the base end portion. Then, the inner peripheral surface 84a of the recessed portion 84 is opposed to the intermediate portion 85 in the radial direction. Specifically, the position of the intermediate portion 85 in the axial direction overlaps with the position of the inner peripheral surface 84a in the axial direction. The intermediate portion 85 has an arc-shaped outer peripheral surface 85a, and also has a first protrusion 85b formed to be projected radially outward from the center in a peripheral direction of the outer peripheral surface 85a.

As shown in FIGS. 12A and 12C, in the state where the pole 83 projects in a radial direction, that is, in the state where the internal tooth 27a and the external tooth 32a engage with each other, the top end surface of the first protrusion 85b located radially outward is located more radially inward than the inner peripheral surface 84a as well as is located more radially outward than the top end surface of the restricting portion 84d located radially inward.

On the other hand, in the state where the pole 83 is retracted in a radial direction, that is, in the released state of the engagement between the internal tooth 27a and the external tooth 32a, the top end surface of the first protrusion 85b located radially outward is located more radially inward than the top end surface of the restricting portion 84d located radially inward (see FIG. 12B). Therefore, the rotational angle of the upper plate 82 relative to the lower plate 81 is kept at a corresponding predetermined angle as a result that the first or the second stopper portion 84b or 84c opposed in a circumferential direction of either one of the second protrusions 81a is brought into contact with the upper plate 82 (see FIGS. 12B and 12C).

Especially, as shown in FIG. 12B, in the state where the first stopper portion 84b is brought into contact with either one of the second protrusions 81a, both of the restricting portions 84d are opposed to the top end surface of the first protrusion 85b. Therefore, in this state, the first protrusion 85b is brought into contact with the restricting portion 84d so that the movement in the radial direction of the pole 83 is restricted and the engagement between the internal tooth 27a and the external tooth 32a is disabled. At this time, the permissive state of the rotation of the upper plate 82 relative to the lower plate 81 is kept as it is.

As shown in FIG. 12B, the restricted state of the rotation of the upper plate 82 in the illustrated counterclockwise direction by the lower plate 81 (second protrusion 81a) corresponds to a forward tilted state where the seatback frame 12 is rotated to the foremost position relative to the seat cushion frame 11. On the other hand, as shown in FIG. 12C, the restricted state of the rotation of the upper plate 82 in the illustrated clockwise direction by the lower plate 81 (second protrusion 81a) corresponds to a rearward tilted state where the seatback frame 12 is rotated to the rearmost position relative to the seat cushion frame 11. Specifically, in the forward tilted state, the permissive state of the rotation of the upper plate 82 relative to the lower plate 81 is kept as it is, and the rearward rotation of the seatback frame 12 is permitted. On the other hand, in the rearward tilted state, the rotation of the upper plate 82 relative to the lower plate 81 is restricted and the rotational angle of the seatback frame 12 is firmly kept as it is.

As described above in detail, according to this embodiment, the following effect can be obtained.

(1) In this embodiment, two first protrusions 85b of the plurality of poles 83 are brought into contact with the restricting portions 84d, so that the engagement between the internal tooth 27a and the external tooth 32a is disabled, whereas the permissive state of the rotation of the upper plate 82 relative to the lower plate 81 is kept as it is. On the other hand, the first or second stopper portion 84b, 84c is brought into contact with the second protrusion 81a of the lower plate 81 which does not influence on the shape of each pole 83, so that the rotational angle of the upper plate 82 relative to the lower plate 81 is kept at each corresponding predetermined angle. In this case, since all of the plurality of poles 83 are in the identical shape, there is no need of preparing plural kinds of poles for achieving the rotational operations of the lower plate 81 and the upper plate 82. Thus, an increase in the number of the kinds of parts can be suppressed, and in turn, cost reduction can be achieved. Especially, since there is no need of providing a second protrusion to the poles 83, the shape of the poles 83 can be more simplified.

(2) In this embodiment, when the permissive state (unlocked state) of the rotation of the upper plate 82 relative to the lower plate 81 is kept as it is, the first protrusions 85b are simultaneously brought into contact with two restricting portions 84d, so that the engagements of the external teeth 32a of two poles 83 and the internal teeth 27a of the upper plate 82 are individually disabled. Thus, the interference between the external teeth 32a of the poles 83 and the internal teeth 27a of the upper plate 82 can be prevented more assuredly, and as a result, excellent operability can be obtained.

(3) In this embodiment, since the lower plate 81 useable for both of the left and right lock mechanisms paring up with each other is employed, an increase in the kinds of parts can be suppressed.

Seventh Embodiment

Hereinafter, a seventh embodiment which embodies the present invention will mow be described with reference to the drawings. The seventh embodiment differs from the sixth embodiment in that the contact between a protrusion (a second protrusion) for keeping the rotational angle of an upper plate relative to a lower plate at a predetermined angle and a stopper portion is simultaneously performed at two locations. Thus, detailed descriptions of the structures of the seventh embodiment identical to those of the sixth embodiment will be omitted.

Figure 13:
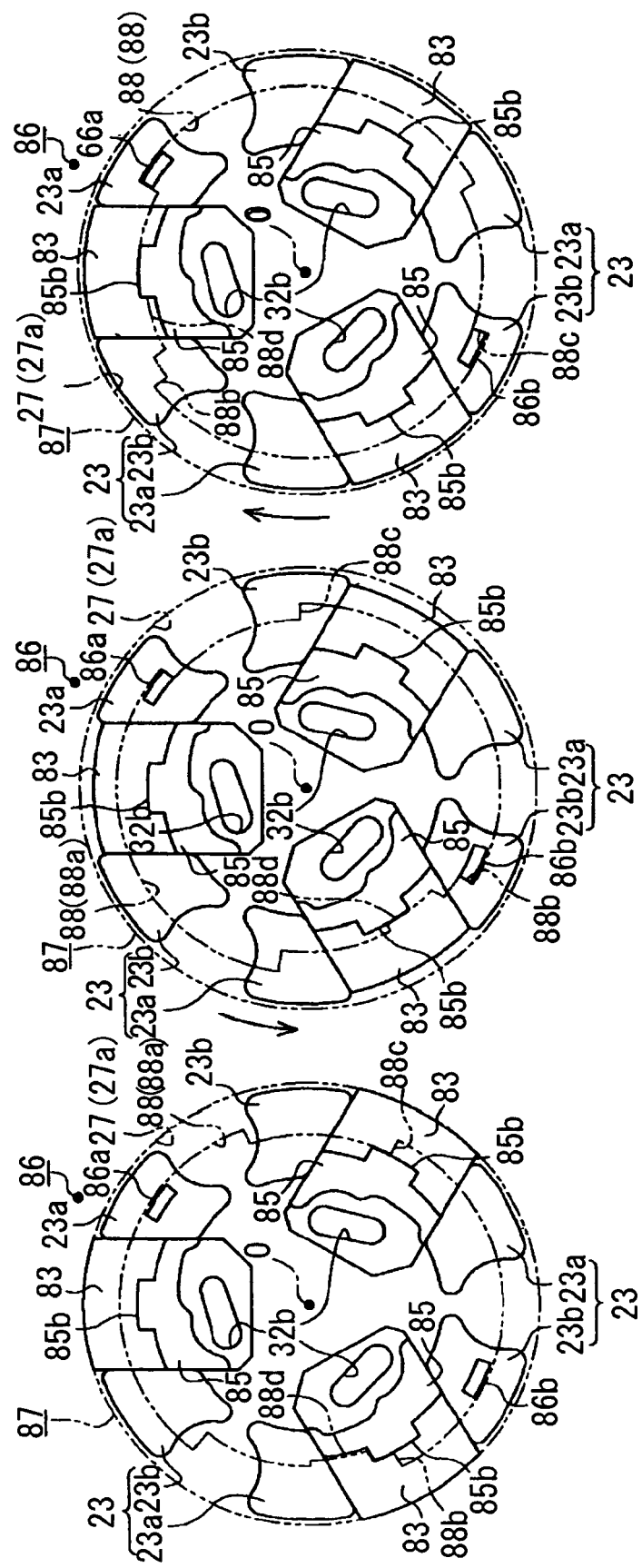
FIG. 13A is a front view schematically showing a seventh embodiment of the present invention.
FIG. 13B is a front view schematically showing the seventh embodiment.
FIG. 13C is a front view schematically showing the seventh embodiment.

FIGS. 13A-13C is a front view schematically showing a lower plate 86, an upper plate 87, and a pole 83. As shown in FIGS. 13A-13C, each of the molded portions 23a and 23b disposed at opposite sides interposing a rotational axis O (at the upper-right side and the lower-left side in FIGS. 13A-13C) at the plurality of protrusions 23 included in the lower plate 86 is formed with second protrusions 86a and 86b projecting to be parallel to the axial direction. These second protrusions 86a and 86b are arranged in such a manner that the lower plate 86 and its mirror-reflected image are in an identical structure.

A recessed portion 88 is formed at an inner peripheral side of an internal tooth 27a in the recessed portion 27 of the upper plate 87. The recessed portion 88 is further recessed into a circular shape concentric with the recessed portion 27 in the axial direction and having an inner diameter smaller than the inner diameter of the recessed portion 27. The upper plate 87 comprises stopper portions 88b and 88c formed to be projected radially inward from the inner peripheral surface 88a at each angular position between the second protrusions 86a and 86b. The top end surfaces of the second protrusions 86a and 86b located radially outward is located more radially inward than the inner peripheral surface 88a, as well as is located more radially outward than the top end surfaces of the stopper portions 88b and 88c located radially inward. The second protrusions 86a and 86b are formed to be projected utilizing the space created at the side of the recessed portion 88. Specifically, the positions in the axial direction of the second protrusions 86a and 86b overlaps with the position in the axial direction of the inner peripheral surface 88a.

Further, the upper plate 87 comprises a restricting portion 88d formed to be projected radially inward from the inner peripheral surface of the intermediate portion in the circumferential direction of one of the stopper portions 88b.

Likewise the sixth embodiment, the inner peripheral surface 88a of the recessed portion 88 is opposed to the intermediate portion 85 of the pole 83 in the radial direction.

As shown in FIGS. 13A and 13C, in the state where the pole 83 projects in a radial direction, that is, in the state where the internal tooth 27a and the external tooth 32a engage with each other, the top end surface of the first protrusion 85b located radially outward is located more radially inward than the inner peripheral surface 88a, as well as is located more radially outward than the top end surface of the restricting portion 88d located radially inward.

On the other hand, in the state where the pole 83 is retracted in a radial direction, that is, in the released state of the engagement between the internal tooth 27a and the external tooth 32a, the top end surface of the first protrusion 85b is located more radially inward than the top end surface of the restricting portion 88d located radially inward (see FIG. 13B). Therefore, the rotational angle of the upper plate 87 relative to the lower plate 86 is kept at a corresponding predetermined angle as a result that the stopper portions 88b and 88c opposed in a circumferential direction of the individual second protrusions 81a are brought into contact with the upper plate 87 (see FIGS. 13B and 13C).

Especially, as shown in FIG. 13B, in the state where the end surface at one side of each of the stopper portions 88b and 88c in the circumferential direction (at the side in the counterclockwise direction in FIGS. 13A-13C) is in contact with the second protrusions 86b and 86a respectively, the restricting portion 88d is opposed to the top end surface of the first protrusion 85b. Therefore, in this state, the first protrusion 85b is brought into contact with the restricting portion 88d so that the movement in the radial direction of the pole 32 is restricted and the engagement between the internal tooth 27a and the external tooth 32a is disabled. At this time, the permissive state of the rotation of the upper plate 87 relative to the lower plate 86 is kept as it is.

As shown in FIG. 13B, the restricted state of the rotation of the upper plate 87 in the illustrated counterclockwise direction by the lower plate 86 (second protrusions 86a and 86b) corresponds to a forward tilted state where the seatback frame 12 is rotated to the foremost position relative to the seat cushion frame 11. On the other hand, as shown in FIG. 13C, the restricted state of the rotation of the upper plate 87 in the illustrated clockwise direction by the lower plate 86 (second protrusions 86a and 86b) corresponds to a rearward tilted state where the seatback frame 12 is rotated to the rearmost position relative to the seat cushion frame 11. Specifically, in the forward tilted state, the permissive state of the rotation of the upper plate 87 relative to the lower plate 86 is kept as it is, and the rearward rotation of the seatback frame 12 is permitted. On the other hand, in the rearward tilted state, the rotation of the upper plate 87 relative to the lower plate 86 is restricted and the rotational angle of the seatback frame 12 is firmly kept as it is.

Figure 14:
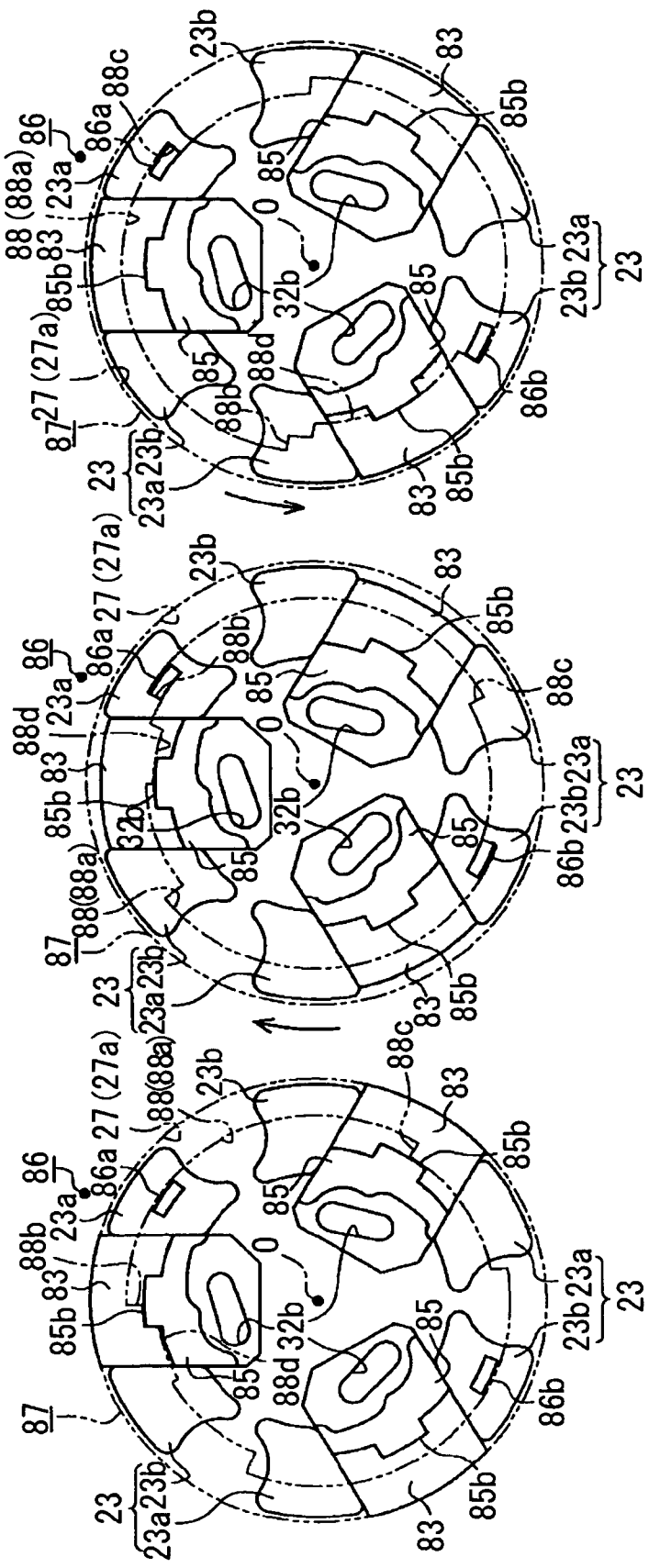
FIG. 14A is a front view schematically showing the seventh embodiment.
FIG. 14B is a front view schematically showing the seventh embodiment.
FIG. 14C is a front view schematically showing the seventh embodiment.

In this context, FIGS. 14A-14C respectively show the lower plate 86 and the like disposed at the left side seen from the front of the vehicle in a manner corresponding to each of the operations shown in FIGS. 13A-13C. As is obvious from FIGS. 14A-14C, although the upper plate 87 is separately required at the left and right sides due to its asymmetric structure, other parts (the lower plate 86 and the pole 83) may be commonly used for the left and right sides. In this case, it is seen that the same operation can be achieved at left and right sides.

As described above in detail, according to this embodiment, the following effect can be obtained.

(1) In this embodiment, one of the first protrusions 85b of the plurality of poles 83 is brought into contact with the restricting portion 88d, so that the engagement between the internal tooth 27a and the external tooth 32a is disabled, whereas the permissive state of the rotation of the upper plate 26 relative to the lower plate 21 is kept as it is. On the other hand, the stopper portions 88b and 88c are brought into contact with the second protrusions 86a and 86b of the lower plate 86 which does not influence onto the shape of each pole 83, so that the rotational angle of the upper plate 87 relative to the lower plate 86 is kept at each corresponding predetermined angle. In this case, since all of the plurality of poles 83 are in the identical shape, there is no need of preparing plural kinds of poles for achieving the rotational operations of the lower plate 86 and the upper plate 87. Thus, an increase in the number of the kinds of parts can be suppressed, and in turn, cost reduction can be achieved. Especially, there is no need of providing a second protrusion to the pole 83, the shape of the pole 83 can be more simplified.

(2) In this embodiment, in the state where the rotational angle of the upper plate 87 relative to the lower plate 86 is kept at a predetermined angle, two second protrusions 86b and 86a and the stopper portions 88b and 88c are simultaneously brought into contact with each other. Thus, these protrusions and stopper portions share the operation of keeping the state described above. Thus, the rotational angle of the upper plate 87 relative to the lower plate 86 can be kept at a predetermined angle more reliably.

The foregoing embodiments may be modified as follows.

In the foregoing third and fourth embodiments, the arrangement relationship in the axial direction between the first protrusions 55a, 65 and the restricting portions 54b, 64b, and the second protrusions 55c, 62b and the stopper portions 53b, 63b may be reversed.

Figure 15:
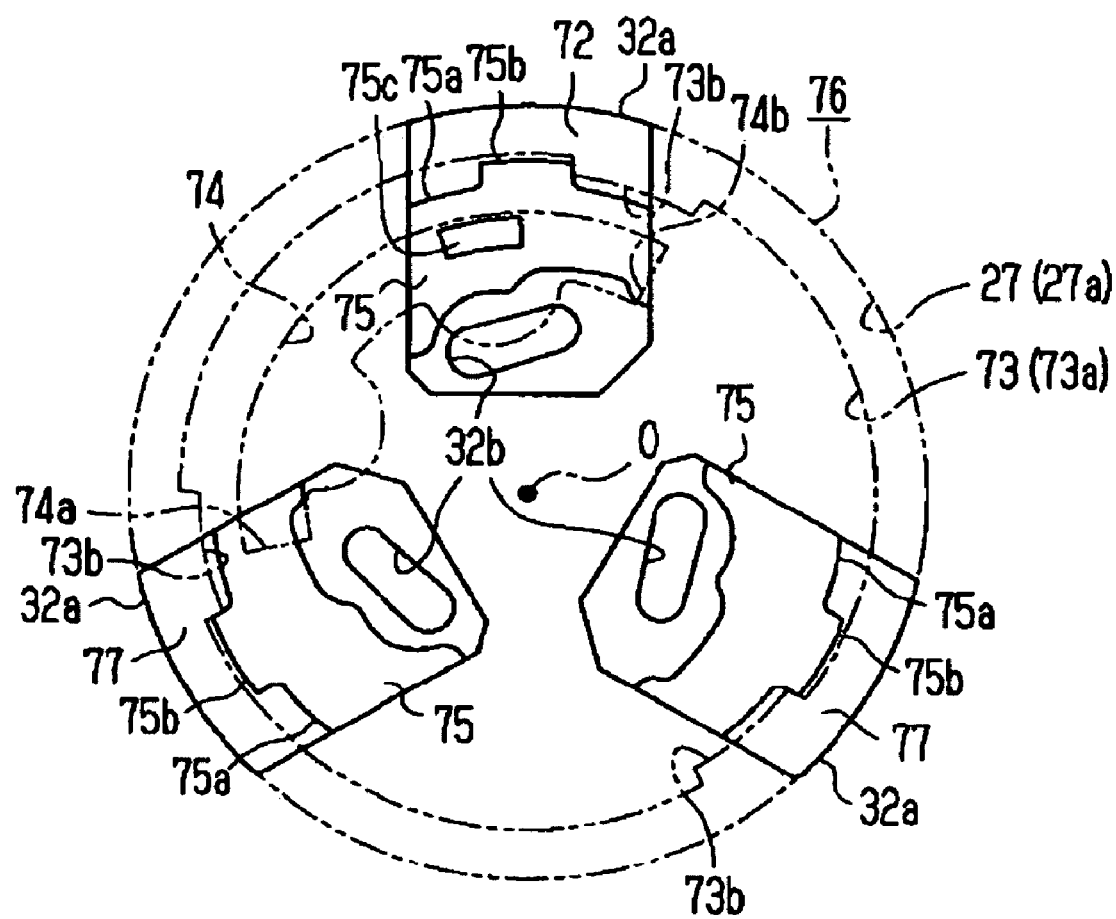
FIG. 15 is a front view schematically showing a modification of the present invention.

In the foregoing fourth embodiment, as shown in FIG. 15, an upper plate 76 formed with only one second recessed portion 74 may be employed. In this case, a pole 72 disposed in correspondence with the second recessed portion 74 is required, but the second protrusion 75c can be omitted from the pole 77.

The second protrusion for keeping the rotational angel of the upper plate relative to the lower plate may be formed on a holder 29 as a to-be-connected member. For example, a stopper portion is formed to be projected radially outward from the outer peripheral surface at the back surface of the upper plate. Then, a second protrusion is formed to be projected radially inward from the inner peripheral portion of the holder 29 in such a manner that the stopper portion is opposed in the circumferential direction. Even after this modification is made, the rotational angle of the upper late relative to the lower plate is kept at a corresponding predetermined angle by contact with the stopper portion opposed in the circumferential direction of the second protrusion of the holder 29. It is preferable to provide engagement mechanism between the holder 29 and the lower plate in order to connect the holder 29 with the lower plate so that the rotation of the holder 29 relative to the lower plate is disabled.

In each of the foregoing embodiments, the predetermined angle at which the rotational angle of the upper plate relative to the lower plate is kept may be only a predetermined angle corresponding to only one of the forward tilted state and rearward tilted state.

In each of the foregoing embodiments, the poles may be in any number of pieces as far as they are in plural pieces.

In each of the foregoing embodiments, the lower plate and the upper plate are respectively kept at the seat cushion side and the seatback side. Alternatively, this relationship may be reversed.

According to the embodiment of the present invention, the first protrusion of each pole is brought into contact with the restricting portion, so that the engagement between the internal tooth and the external tooth is disabled, whereas the permissive state of the rotation of the second plate relative to the first plate is kept as it is. On the other hand, the second protrusions of each pole is brought into contact with the stopper portion, so that the rotational angle of the second plate relative to the first plate is kept at predetermined angle. In this case, since all of the plurality of poles is in the identical shape, there is no need of preparing plural kinds of poles for achieving the rotational operations of the first plate and the second plate. Thus, an increase in the number of the kinds of parts can be suppressed.

According to the embodiment of the present invention, since the first protrusion is also used as the second protrusion, the shape of the poles is more simplified.

According to the embodiment of the present invention, since the restricting portions are also used as the stopper portions, the shape of the second plate is more simplified.

According to the embodiment of the present invention, the restricting portions and the stopper portions are formed on the second plate in such a manner that their positions in an axial direction differ from each other. Therefore, the contact between the first protrusions and the restricting portions, and the contact between the second protrusions and the stopper portions are made at positions different from each other in an axial direction. Due to this structure, the interference between the operations related to these contacts (the maintenance of the permissive state of the rotation of the second plate relative to the first plate, and the retention of the rotational angle of the second plate relative to the first plate at a predetermined angle) can be preferably suppressed.

According to the embodiment of the present invention, the first protrusion is provided on an outer wall surface formed into a half-blanked state to create the cam hole. Due to this structure, as compared with the case where the first protrusion and the cam hole are separately arranged and formed for example, the shape of the pole can be further simplified.

According to the embodiment of the present invention, the restricting portions and the stopper portions (second recessed portions) are formed on the second plate in such a manner that their positions in an axial direction differ from each other. Therefore, the contact between the first protrusions and the restricting portions, and the contact between the second protrusions and the stopper portions are made at positions different from each other in an axial direction. Due to this structure, the interference between the operations related to these contacts (maintenance of the permissive state of the rotation of the second plate relative to the first plate, and the retention of the rotational angle of the second plate relative to the first plate at a predetermined angle) can be preferably suppressed.

According to the embodiment of the present invention, at least one of the first protrusions of the plurality of poles is brought into contact with the restricting portion, so that the engagement between the internal tooth and the external tooth is disabled, whereas the permissive state of the rotation of the second plate relative to the first plate is kept as it is. On the other hand, the stopper portion is brought into contact with the second protrusion of either one of the first plate which does not influence on the shape of each pole and a to-be-connected body unrotatably connected to the first plate, so that the rotational angle of the second plate relative to the first plate is kept at a predetermined angle. In this case, since all of the plurality of poles is in the identical shape, there is no need of preparing plural kinds of poles for achieving the rotational operations of the first and the second plates. Thus, an increase in the number of the kinds of parts can be suppressed.

According to the embodiment of the present invention, in the state where the rotational angle of the second plate relative to the first plate is kept at a predetermined angle, the plural pairs of the second protrusions and the stopper portions are simultaneously brought into contact with each other. Thus, these projections and stopper portions share the operation of keeping the state described above. Thus, the rotational angle of the second plate relative to the first plate can be kept at a predetermined angle more reliably.

According to the embodiment of the present invention, a seat reclining apparatus for a vehicle capable of suppressing an increase in the kinds of parts can be provided.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
   a first plate held at one of a seat cushion frame and a seatback frame;
   a second plate held at the other one of the seat cushion frame and the seatback frame, the second plate having an internal tooth and rotatably supported by the first plate;
   a pole having an external tooth facing the internal tooth in a radial direction and arranged at the first plate, the pole operated to move in the radial direction so as to restrict a rotation of the second plate relative to the first plate with the internal tooth and the external tooth engaged or to allow the rotation of the second plate relative to the first plate with the internal tooth and the external tooth disengaged;
   a first protrusion provided at the pole;
   a restricting portion provided at the second plate so as to face the first protrusion at a radially outward side, the restricting portion coming in contact with the first protrusion so that the internal tooth and the external tooth are prohibited from being engaged;
   a second protrusion provided at the pole; and
   a stopper portion provided at the second plate so as to face the second protrusion in a circumferential direction for keeping a rotational angle of the second plate relative to the first plate at a predetermined angle upon a contact with the second protrusion.

2. The seat relining apparatus for a vehicle according to claim 1, wherein
   the second plate includes a recessed portion recessed into a circular shape in an axial direction at an inner peripheral side of the internal tooth, and wherein
   the restricting portion and the stopper portion are respectively formed to be projected radially inward from an inner peripheral surface of the recessed portion.

3. The seat relining apparatus for a vehicle according to claim 2, wherein
   the first protrusion is also served as the second protrusion, and wherein
   the second stopper portion is formed continuous to one side in the circumferential direction of the restricting portion to be protruded more radially inward than the restricting portion.

4. The seat relining apparatus for a vehicle according to claim 2, wherein
   the restricting portion is also served as the stopper portion, and wherein
   the second protrusion is formed continuous to one side in the circumferential direction of the first protrusion to be protruded more radially outward than the restricting portion.

5. The seat relining apparatus for a vehicle according to claim 1, wherein
   the second plate includes a first recessed portion recessed into a circular shape in an axial direction at an inner peripheral side of the internal tooth, and a second recessed portion further recessed into a circular shape in the axial direction at an inner peripheral side of the first recessed portion, and wherein
   the restricting portion and the stopper portion are respectively formed to be protruded radially inward from one of the other inner peripheral surface of the first recessed portion and the second recessed portion.

6. The seat relining apparatus for a vehicle according to claim 5, further comprising:
   a cam hole formed by half-blanking on the pole; and
   a cam having a projection to be inserted into the cam hole, for pressing the cam hole by the projection as the cam rotates to move the pole into the radial direction, wherein the first protrusion is formed on a half-blanking outer wall surface that constitutes the cam hole.

7. The seat relining apparatus for a vehicle according to claim 1, wherein
   the second plate includes a first recessed portion recessed into a circular shape in an axial direction at an inner peripheral side of the internal tooth and a second recessed portion further recessed into an arc shape in the axial direction at an inner peripheral side of the first recessed portion so that the second protrusion is inserted therein, wherein the restricting portion is formed to be protruded radially inward from the inner peripheral surface of the first recessed portion, and wherein the stopper portion is formed by an inner peripheral surface of the second recessed portion facing each second protrusion in the circumferential direction.

8. A seat reclining apparatus for a vehicle, comprising:

a first plate held at one of a seat cushion frame and a seatback frame;

a second plate held at the other one of the seat cushion frame and the seatback frame, the second plate having an internal tooth and rotatably supported by the first plate;

a pole having an external tooth facing the internal tooth in a radial direction and arranged at the first plate, the pole operated to move in the radial direction so as to restrict a rotation of the second plate relative to the first plate with the internal tooth and the external tooth engaged or to allow the rotation of the second plate relative to the first plate with the internal tooth and the external tooth disengaged;

a first protrusion provided at the pole;

a restricting portion provided at the second plate so as to face at least one of the first protrusion of the pole at a radially outward side, the restriction portion coming in contact with the first protrusion so that the internal tooth and the external tooth are prohibited from being engaged;

a second protrusion provided at one of the first plate and a to-be-connected body unrotatably connected with the first plate; and a stopper portion provided at the second plate so as to face the second protrusion in a circumferential direction for keeping a rotational angle of the second plate relative to the first plate at a predetermined angle upon a contact with the second protrusion.

9. The seat relining apparatus for a vehicle according to claim 8, wherein the plural pairs of the second protrusions and the stopper portions are provided.

\* \* \* \* \*